(12) United States Patent
Yuan et al.

(10) Patent No.: US 11,902,054 B2
(45) Date of Patent: Feb. 13, 2024

(54) UPLINK MULTI-STATION CHANNEL ESTIMATION METHOD, STATION, AND ACCESS POINT

(71) Applicant: HUAWEI TECHNOLOGIES CO., LTD., Guangdong (CN)

(72) Inventors: Fangchao Yuan, Nanjing (CN); Peng Chen, Nanjing (CN); Bo Yang, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 44 days.

(21) Appl. No.: 17/691,480

(22) Filed: Mar. 10, 2022

(65) Prior Publication Data

US 2022/0200822 A1 Jun. 23, 2022

Related U.S. Application Data

(63) Continuation of application No. PCT/CN2020/104898, filed on Jul. 27, 2020.

(30) Foreign Application Priority Data

Sep. 12, 2019 (CN) .......................... 201910866513.3

(51) Int. Cl.
*H04L 25/02* (2006.01)

(52) U.S. Cl.
CPC ...... *H04L 25/0204* (2013.01); *H04L 25/0242* (2013.01)

(58) Field of Classification Search
CPC ............. H04L 25/0204; H04L 25/0242; H04L 25/0244; H04L 25/0246; H04L 25/0226;
(Continued)

(56) References Cited

U.S. PATENT DOCUMENTS 9,935,794 B1 * 4/2018 Cao ...................... H04L 5/0048
10,211,958 B2 2/2019 Lu et al.
(Continued)

FOREIGN PATENT DOCUMENTS

CN 103259757 A 8/2013
CN 107040295 A 8/2017
(Continued)

OTHER PUBLICATIONS

Broadcom Corporation, ZC Based P-SCH Sequences and Initial Frequency Estimation Uncertainty, 3GPP TSG RAN WG 1 #49-BIS, R1-073084, Orlando, USA Jun. 25-29, 2007, 20 Pages.
(Continued)

*Primary Examiner* — Sung S Ahn
(74) *Attorney, Agent, or Firm* — HUAWEI TECHNOLOGIES CO., LTD.

(57) ABSTRACT

This application provides an uplink multi-station channel estimation method, a station (STA), and an access point (AP), which can be applied to an uplink multi-user multiple-input multiple-output scenario. The uplink multi-station channel estimation method includes: a STA generating a frame including a first group of training sequences and a second group of training sequences, and sending the frame to the AP. The AP calculates a frequency offset value between the STA and the AP based on the received first group of training sequences and the received second group of training sequences. The AP performs channel estimation based on the calculated frequency offset value. According to the technical solutions provided in this application, the AP can more accurately learn of frequency offset values between a plurality of STAs and the AP. This improves channel estimation precision.

28 Claims, 10 Drawing Sheets

| Preamble sequence | Preset training sequence $\times P_{11}$ | Preset training sequence $\times P_{11}$ | | ... | Preset training sequence $\times P_{1Q}$ | Preset training sequence $\times P_{1Q}$ | Data from a STA #1 |
|---|---|---|---|---|---|---|---|
| Preamble sequence | Preset training sequence $\times P_{21}$ | Preset training sequence $\times P_{21}$ | | ... | Preset training sequence $\times P_{2Q}$ | Preset training sequence $\times P_{2Q}$ | Data from a STA #2 |
| Preamble sequence | | ... | | ... | ... | ... | ... |
| Preamble sequence | Preset training sequence $\times P_{M1}$ | Preset training sequence $\times P_{M1}$ | | ... | Preset training sequence $\times P_{MQ}$ | Preset training sequence $\times P_{MQ}$ | Data from a STA #M |

(58) Field of Classification Search
CPC ............. H04L 25/0228; H04L 27/2613; H04L 27/2657; H04L 27/2695
See application file for complete search history.

(56) References Cited

U.S. PATENT DOCUMENTS

| | | | |
|---|---|---|---|
| 2015/0098344 A1 | 4/2015 | Niu et al. | |
| 2017/0026952 A1 | 1/2017 | Park et al. | |
| 2017/0105215 A1* | 4/2017 | Li | H04W 72/0453 |
| 2017/0141899 A1* | 5/2017 | Lu | H04L 5/0023 |
| 2019/0268115 A1 | 8/2019 | Liu et al. | |

FOREIGN PATENT DOCUMENTS

| | | |
|---|---|---|
| CN | 107210987 A | 9/2017 |
| CN | 107276926 A | 10/2017 |
| CN | 107276927 A | 10/2017 |
| CN | 109302740 A | 2/2019 |
| CN | 110113276 A | 8/2019 |
| WO | 2016065515 A1 | 5/2016 |
| WO | 2017062129 A1 | 4/2017 |

OTHER PUBLICATIONS

Doc.: IEEE 802.11-15/0602r6, Qinghua Li et al., HE-LTF Sequence for UL MU-MIMO, Sep. 2015, total 33 pages.

Lin Lefeng, Research of Timing Synchronization and Frequency Offset Estimation in OFDM System, Northeastern University, 2015, 2 Pages (abstract).

IEEE Std 802.11ac-2013, IEEE Standard for Information technology-Telecommunications and information exchange between systems Local and metropolitan area networks—Specific requirements, Part 11: Wireless LAN Medium Access Control (MAC) and Physical Layer (PHY) Specifications, Amendment 4: Enhancements for Very High Throughput for Operation in Bands below 6 GHZ, Approved Dec. 11, 2013, total 425 pages.

IEEE P802.11ax/D2.2, Feb. 2018, Draft Standard for Information technology—Telecommunications and information exchange between systems Local and metropolitan area networks—Specific requirements—Part 11: Wireless LAN Medium Access Control(MAC) and Physical Layer (PHY) Specifications, Amendment 6: Enhancements for High Efficiency WLAN. 620 pages.

* cited by examiner

| Preamble sequence | Preset training sequence $\times P_{11}$ | ⋮ | Preset training sequence $\times P_{1Q}$ | Preset training sequence $\times P_{11}$ | ⋮ | Preset training sequence $\times P_{1Q}$ | Data from a STA #1 |
|---|---|---|---|---|---|---|---|
| Preamble sequence | Preset training sequence $\times P_{21}$ | ⋮ | Preset training sequence $\times P_{2Q}$ | Preset training sequence $\times P_{21}$ | ⋮ | Preset training sequence $\times P_{2Q}$ | Data from a STA #2 |
| ⋮ | ⋮ | ⋮ | ⋮ | ⋮ | ⋮ | ⋮ | ⋮ |
| Preamble sequence | Preset training sequence $\times P_{M1}$ | ⋮ | Preset training sequence $\times P_{MQ}$ | Preset training sequence $\times P_{M1}$ | ⋮ | Preset training sequence $\times P_{MQ}$ | Data from a STA #M |

FIG. 7A

| Preamble sequence | Preset training sequence $\times P_{11}$ | Preset training sequence $\times P_{11}$ | ... | Preset training sequence $\times P_{1Q}$ | Preset training sequence $\times P_{1Q}$ | Data from a STA #1 |
|---|---|---|---|---|---|---|
| Preamble sequence | Preset training sequence $\times P_{21}$ | Preset training sequence $\times P_{21}$ | ... | Preset training sequence $\times P_{2Q}$ | Preset training sequence $\times P_{2Q}$ | Data from a STA #2 |
| Preamble sequence | ... | ... | ... | ... | ... | ... |
| Preamble sequence | Preset training sequence $\times P_{M1}$ | Preset training sequence $\times P_{M1}$ | ... | Preset training sequence $\times P_{MQ}$ | Preset training sequence $\times P_{MQ}$ | Data from a STA #M |

FIG. 7B

| Preamble sequence | Preset training sequence $\times P_{11}$ | Preset training sequence $\times P_{12}$ | Preset training sequence $\times P_{11}$ | Preset training sequence $\times P_{12}$ | ⋮ | Data from a STA #1 |
| Preamble sequence | Preset training sequence $\times P_{21}$ | Preset training sequence $\times P_{22}$ | Preset training sequence $\times P_{21}$ | Preset training sequence $\times P_{22}$ | ⋮ | Data from a STA #2 |
| Preamble sequence | ⋮ | ⋮ | ⋮ | ⋮ | ⋮ | ⋮ |
| Preamble sequence | Preset training sequence $\times P_{M1}$ | Preset training sequence $\times P_{M2}$ | Preset training sequence $\times P_{M1}$ | Preset training sequence $\times P_{M2}$ | ⋮ | Data from a STA #M |

FIG. 7C

| Preamble sequence | Preset training sequence × 1 | Preset training sequence × −1 | Preset training sequence × 1 | Preset training sequence × −1 | Data from a STA #1 |
|---|---|---|---|---|---|
| Preamble sequence | Preset training sequence × 1 | Preset training sequence × 1 | Preset training sequence × 1 | Preset training sequence × 1 | Data from a STA #2 |

FIG. 8A

| Preamble sequence | Preset training sequence × 1 | Preset training sequence × 1 | Preset training sequence × −1 | Preset training sequence × −1 | Data from a STA #1 |
|---|---|---|---|---|---|
| Preamble sequence | Preset training sequence × 1 | Preset training sequence × 1 | Preset training sequence × 1 | Preset training sequence × 1 | Data from a STA #2 |

FIG. 8B

UPLINK MULTI-STATION CHANNEL ESTIMATION METHOD, STATION, AND ACCESS POINT

CROSS-REFERENCE TO RELATED APPLICATIONS

This application is a continuation of International Application No. PCT/CN2020/104898, filed on Jul. 27, 2020, which claims priority to Chinese Patent Application No. 201910866513.3, filed on Sep. 12, 2019. The disclosures of the aforementioned applications are hereby incorporated by reference in their entireties.

TECHNICAL FIELD

This application relates to the communication field, and more specifically, to an uplink multi-station channel estimation method, a station, and an access point.

BACKGROUND

With development of a wireless local area network technology, an uplink multi-user multiple-input multiple-output (UL MU-MIMO) technology is introduced. A plurality of stations (STA) simultaneously send data to an access point (AP) in uplink, and interference between the stations is eliminated by using a spatial multiplexing technology and orthogonal equalization on an AP side. This effectively improves uplink spectrum resource utilization.

However, stations have different types and different radio frequency links. Therefore, carrier frequencies used when the stations send data are hardly consistent, that is, frequency synchronization cannot be implemented between the plurality of stations. As a result, when channel estimation is performed on the AP side, it is difficult for channels of the plurality of stations to be orthogonal, and the channels crosstalk with each other. Consequently, channel estimation precision is greatly reduced. Therefore, how to improve estimation precision of channel information of the plurality of stations in an uplink multi-user multiple-input multiple-output scenario becomes a problem to be urgently resolved.

SUMMARY

This application provides an uplink multi-station channel estimation method, a station, and an access point. Each of a plurality of stations sends a frame including two groups of training sequences to an access point, where the two groups of training sequences can improve accuracy of calculating a frequency offset value between the station and the access point. In this way, precision of performing channel estimation by the access point based on the frequency offset value can be improved.

According to a first aspect, an uplink multi-station channel estimation method is provided. The method is applied to any one of a plurality of stations STAs communicating with an access point AP, and includes: The station STA generates a frame, where the frame includes a first group of training sequences and a second group of training sequences, the first group of training sequences and the second group of training sequences are used to calculate a frequency offset value between the STA and the access point AP, and the frequency offset value is used for channel estimation; and the STA sends the frame to the AP.

According to the uplink multi-station channel estimation method provided in this embodiment of this application, the STA generates the frame including the first group of training sequences and the second group of training sequences, and sends the generated frame to the AP. The two groups of training sequences can improve accuracy of calculating the frequency offset value between the STA and the AP. In this way, precision of performing channel estimation by the AP based on the frequency offset value can be improved.

With reference to the first aspect, in some implementations of the first aspect, before the STA generates the frame, the method further includes: The STA receives indication information from the AP, where the indication information is used to indicate the STA to generate the frame.

According to the uplink multi-station channel estimation method provided in this embodiment of this application, the AP may send the indication information to the STA, to indicate the STA to generate the frame including the first group of training sequences and the second group of training sequences.

With reference to the first aspect, in some implementations of the first aspect, the indication information is further used to indicate whether a preset phase identification matrix is used in a process in which the STA generates the frame; and/or the indication information is further used to indicate an arrangement mode of the first group of training sequences and the second group of training sequences in the frame.

According to the uplink multi-station channel estimation method provided in this embodiment of this application, the indication information may be further used to indicate whether to add a phase identifier when the STA generates the frame, and/or indicate the arrangement mode in which the STA arranges the first group of training sequences and the second group of training sequences in the frame. An optional manner is provided for a structure of the frame generated by the STA.

With reference to the first aspect, in some implementations of the first aspect, the first group of training sequences is obtained by multiplying a preset training sequence by an element that corresponds to the STA and that is in a matrix P, and the second group of training sequences is obtained by multiplying the preset training sequence by an element that corresponds to the STA and that is in a matrix P or a matrix P1. The matrix P1 is a matrix determined based on a preset phase identification matrix, and the matrix P is a matrix that is used for channel estimation and that is known to the AP and the plurality of STAs.

According to the uplink multi-station channel estimation method provided in this embodiment of this application, the first group of training sequences and the second group of training sequences may be determined based on the matrix P or the matrix P1, to provide a feasible solution of obtaining the first group of training sequences and the second group of training sequences.

With reference to the first aspect, in some implementations of the first aspect, the first group of training sequences occupies Q first locations in the frame, and the second group of training sequences occupies Q second locations in the frame. The Q first locations and the Q second locations are sequentially arranged, or the Q first locations and the Q second locations are alternately arranged at an equal interval, where Q is an integer that meets a preset correspondence with M, and M is a total quantity of antennas of the plurality of STAs.

According to the uplink multi-station channel estimation method provided in this embodiment of this application, there are a plurality of possible locations for the first group of training sequences and the second group of training sequences in the frame, to provide a flexible solution for the arrangement mode of the first group of training sequences and the second group of training sequences.

With reference to the first aspect, in some implementations of the first aspect, the first group of training sequences includes one or more first training sequences, and the second group of training sequences includes one or more second training sequences.

According to the uplink multi-station channel estimation method provided in this embodiment of this application, the first group of training sequences and the second group of training sequences each may include at least one training sequence.

According to a second aspect, an uplink multi-station channel estimation method is provided. The method includes: An access point AP receives a frame sent by each of a plurality of STAs, where the frame includes a first group of training sequences and a second group of training sequences, and the first group of training sequences and the second group of training sequences are used for calculating a frequency offset value between a STA and the access point AP; and the AP performs channel estimation based on frequency offset values between the M STAs and the AP.

According to the uplink multi-station channel estimation method provided in this embodiment of this application, the AP receives, from the plurality of STAs, the frames including a first group of training sequences and a second group of training sequences. The two groups of training sequences can improve accuracy of calculating the frequency offset value between the STA and the AP. In this way, precision of performing channel estimation by the AP based on the frequency offset value can be improved.

With reference to the second aspect, in some implementations of the second aspect, the AP sends indication information to the STA, where the indication information is used to indicate the STA to generate the frame.

According to the uplink multi-station channel estimation method provided in this embodiment of this application, the AP may send the indication information to the STA, to indicate the STA to generate the frame including the first group of training sequences and the second group of training sequences.

With reference to the second aspect, in some implementations of the second aspect, the indication information is further used to indicate whether a preset phase identification matrix is used in a process in which the STA generates the frame; and/or the indication information is further used to indicate an arrangement mode of the first group of training sequences and the second group of training sequences in the frame.

According to the uplink multi-station channel estimation method provided in this embodiment of this application, the indication information may be further used to indicate whether to add a phase identifier when the STA generates the frame, and/or indicate the arrangement mode in which the STA arranges the first group of training sequences and the second group of training sequences in the frame. An optional manner is provided for a structure of the frame generated by the STA.

With reference to the second aspect, in some implementations of the second aspect, the first group of training sequences is obtained by multiplying a preset training sequence by an element that corresponds to the STA and that is in a matrix P, and the second group of training sequences is obtained by multiplying the preset training sequence by an element that corresponds to the STA and that is in a matrix P or a matrix P1. The matrix P1 is a matrix determined based on a preset phase identification matrix, and the matrix P is a matrix that is used for channel estimation and that is known to the AP and the plurality of STAs.

According to the uplink multi-station channel estimation method provided in this embodiment of this application, the first group of training sequences and the second group of training sequences may be determined based on the matrix P or the matrix P1, to provide a feasible solution of obtaining the first group of training sequences and the second group of training sequences.

With reference to the second aspect, in some implementations of the second aspect, that the first group of training sequences and the second group of training sequences are used for calculating a frequency offset value between a STA and the access point AP includes: The plurality of first groups of training sequences sent by the plurality of STAs and a channel information matrix are used for determining a first information matrix, and the plurality of second groups of training sequences sent by the plurality of STAs and a channel information matrix are used for determining a second information matrix. The first information matrix and the second information matrix are used for calculating the frequency offset values between the plurality of STAs and the AP.

According to the uplink multi-station channel estimation method provided in this embodiment of this application, after the first group of training sequences and the second group of training sequences included in training sequences sent by each STA are sent to the AP side through a channel between each STA and the AP, the AP can receive the first information matrix and the second information matrix, and calculate the frequency offset values between the M STAs and the AP based on the first information matrix and the second information matrix, to provide a feasible solution for the AP to determining of the frequency offset values.

With reference to the second aspect, in some implementations of the second aspect, the performing, by the AP, channel estimation based on frequency offset values between the plurality of STAs and the AP includes: correcting, by the AP, the matrix P based on frequency offset values between the plurality of STAs and the AP; and obtaining a corrected matrix P; determining, by the AP, the channel information matrix based on the first information matrix and/or the second information matrix and the corrected matrix P.

According to the uplink multi-station channel estimation method provided in this embodiment of this application, after obtaining the frequency offset values between the plurality of STAs and the AP, the AP obtains the corrected matrix P based on the frequency offset values and the matrix P, and determines a channel information matrix based on the corrected matrix P and the first information matrix and/or the second information matrix, to complete channel estimation.

With reference to the second aspect, in some implementations of the second aspect, the first group of training sequences occupies Q first locations in the frame, and the second group of training sequences occupies Q second locations in the frame. The Q first locations and the Q second locations are sequentially arranged, or the Q first locations and the Q second locations are alternately arranged at an equal interval, where Q is an integer that meets a preset correspondence with M, and M is a total quantity of antennas of the plurality of STAs.

According to the uplink multi-station channel estimation method provided in this embodiment of this application, there are a plurality of possible locations for the first group of training sequences and the second group of training sequences in the frame, to provide a flexible solution for the arrangement mode of the first group of training sequences and the second group of training sequences.

With reference to the second aspect, in some implementations of the second aspect, the first group of training sequences includes one or more first training sequences, and the second group of training sequences includes one or more second training sequences.

According to the uplink multi-station channel estimation method provided in this embodiment of this application, the first group of training sequences and the second group of training sequences each may include at least one training sequence.

According to a third aspect, an uplink multi-station channel estimation method is provided. The method is applied to any one of a plurality of stations STAs communicating with an access point AP, and includes: The STA generates a frame, where the frame includes a first group of training sequences and a second group of training sequences, the first group of training sequences includes Q first training sequences, and the second group of training sequences includes Q second training sequences; and the STA sends the frame to the AP, where Q is an integer that meets a preset correspondence with M, and M is a total quantity of antennas of the plurality of STAs.

With reference to the third aspect, in some implementations of the third aspect, the Q first training sequences are respectively the same as the Q second training sequences.

With reference to the third aspect, in some implementations of the third aspect, the Q second training sequences are respectively training sequences obtained by adding phase identification information to the Q first training sequences.

With reference to the third aspect, in some implementations of the third aspect, the Q first training sequences and the Q second training sequences are sequentially arranged in the foregoing frame, or the Q first training sequences and the Q second training sequences are alternately arranged at an equal interval in the frame.

According to a fourth aspect, an uplink multi-station channel estimation method is provided. The method is applied to an access point AP communicating with a plurality of stations STAs, and includes: The AP receives frames from the STAs, where the frame includes a first group of training sequences and a second group of training sequences, the first group of training sequences includes Q first training sequences, and the second group of training sequences includes Q second training sequences; and the AP performs channel estimation based on the first group of training sequences and the second group of training sequences, where Q is an integer that meets a preset correspondence with M, and M is a total quantity of antennas of the plurality of STAs.

With reference to the fourth aspect, in some implementations of the fourth aspect, the Q first training sequences are respectively the same as the Q second training sequences.

With reference to the fourth aspect, in some implementations of the fourth aspect, the Q second training sequences are respectively training sequences obtained by adding phase identification information to the Q first training sequences.

With reference to the fourth aspect, in some implementations of the fourth aspect, the Q first training sequences and the Q second training sequences are sequentially arranged in the frame, or the Q first training sequences and the Q second training sequences are alternately arranged at an equal interval in the frame.

According to a fifth aspect, an uplink multi-station channel estimation apparatus is provided. The uplink multi-station channel estimation apparatus includes a processor, configured to implement functions of the STA in the methods described in the first aspect and the third aspect.

Optionally, the uplink multi-station channel estimation apparatus may further include a memory. The memory is coupled to the processor, and the processor is configured to implement functions of the STA in the methods described in the first aspect and the third aspect. In an embodiment, the memory is configured to store program instructions and data. The memory is coupled to the processor, and the processor may invoke and execute the program instructions stored in the memory, to implement functions of the STA in the methods described in the first aspect and the third aspect.

Optionally, the uplink multi-station channel estimation apparatus may further include a communication interface. The communication interface is used by the uplink multi-station channel estimation apparatus to communicate with another device. When the uplink multi-station channel estimation apparatus is a terminal device, the communication interface may be a transceiver, an input/output interface, a circuit, or the like.

In an embodiment, the uplink multi-station channel estimation apparatus includes a processor and a communication interface.

The processor is configured to run a computer program, so that the uplink multi-station channel estimation apparatus implements any one of the methods described in the first aspect and the third aspect.

The processor communicates with an external device through the communication interface.

It may be understood that the external device may be an object other than the processor, or an object other than the apparatus.

In an embodiment, the uplink multi-station channel estimation apparatus is a chip or a chip system. The communication interface may be an input/output interface, an interface circuit, an output circuit, an input circuit, a pin, a related circuit, or the like on the chip or the chip system. The processor may be alternatively embodied as a processing circuit or a logic circuit.

According to a sixth aspect, an uplink multi-station channel estimation apparatus is provided. The uplink multi-station channel estimation apparatus includes a processor, configured to implement functions of the AP in the methods described in the second aspect and the fourth aspect.

Optionally, the uplink multi-station channel estimation apparatus may further include a memory. The memory is coupled to the processor, and the processor is configured to implement functions of the AP in the methods described in the second aspect and the fourth aspect. In an embodiment, the memory is configured to store program instructions and data. The memory is coupled to the processor, and the processor may invoke and execute the program instructions stored in the memory, to implement functions of the AP in the methods described in the second aspect and the fourth aspect.

Optionally, the uplink multi-station channel estimation apparatus may further include a communication interface. The communication interface is used by the uplink multi-station channel estimation apparatus to communicate with another device. When the uplink multi-station channel estimation apparatus is a network device, the communication interface may be a transceiver, an input/output interface, a circuit, or the like.

In an embodiment, the uplink multi-station channel estimation apparatus includes a processor and a communication interface.

The processor communicates with an external device through the communication interface; and the processor is configured to run a computer program, so that the uplink multi-station channel estimation apparatus implements any one of the methods described in the second aspect and the fourth aspect.

It may be understood that the external device may be an object other than the processor, or an object other than the apparatus.

In an embodiment, the uplink multi-station channel estimation apparatus is a chip or a chip system. The communication interface may be an input/output interface, an interface circuit, an output circuit, an input circuit, a pin, a related circuit, or the like on the chip or the chip system. The processor may be alternatively embodied as a processing circuit or a logic circuit.

According to a seventh aspect, this application provides a computer-readable storage medium. The computer-readable storage medium stores instructions; and when the instructions are run on a computer, the computer is enabled to perform the methods in the foregoing aspects.

According to an eighth aspect, this application provides a computer program product including instructions. When the computer program product is run on a computer, the computer is enabled to perform the methods in the foregoing aspects.

According to a ninth aspect, a communication system is provided, including the uplink multi-station channel estimation apparatus shown in the fifth aspect and the uplink multi-station channel estimation apparatus shown in the sixth aspect.

BRIEF DESCRIPTION OF DRAWINGS

FIG. 7A to FIG. 7C are diagrams depicting frames according to an embodiment of this application;

FIG. 8A and FIG. 8B are diagrams depicting frames generated by two STAs according to an embodiment of this application;

DESCRIPTION OF EMBODIMENTS

The following describes technical solutions of this application with reference to the accompanying drawings.

The embodiments of this application may be applied to a wireless local area network (WLAN). The WLAN may include a plurality of basic service sets (BSS). Network nodes in the BSS include an AP and a STA. Each BSS may include one AP and a plurality of STAs associated with the AP.

The AP may also be referred to as a wireless access point, a hotspot, or the like. APs are access points used by user terminals to access wired networks, and are mainly deployed in homes, buildings, and campuses. A typical AP coverage radius ranges from dozens of meters to hundreds of meters. It should be understood that the APs may also be deployed outdoors. An AP is equivalent to a bridge connecting a wired network to a wireless network. Main functions of the AP are to connect clients of the wireless network together and then connect the wireless network to the Ethernet. Currently, the Institute of Electrical and Electronics Engineers (IEEE) 802.11 series is a main standard used for APs. The AP may be a terminal device or a network device with a wireless fidelity (Wi-Fi) chip. Optionally, the AP may be a device supporting a WLAN standard.

The STA represents a user terminal in this application, and therefore may be directly referred to as a user terminal or a user in the following. The STA may be a wireless communication chip, a wireless sensor, or a wireless communication terminal, for example, a mobile phone supporting a Wi-Fi communication function, a tablet computer supporting a Wi-Fi communication function, a set-top box supporting a Wi-Fi communication function, a smart television supporting a Wi-Fi communication function, a smart wearable device supporting a Wi-Fi communication function, or a computer supporting a Wi-Fi communication function. Optionally, the STA may be a device supporting a WLAN standard.

Figure 1:
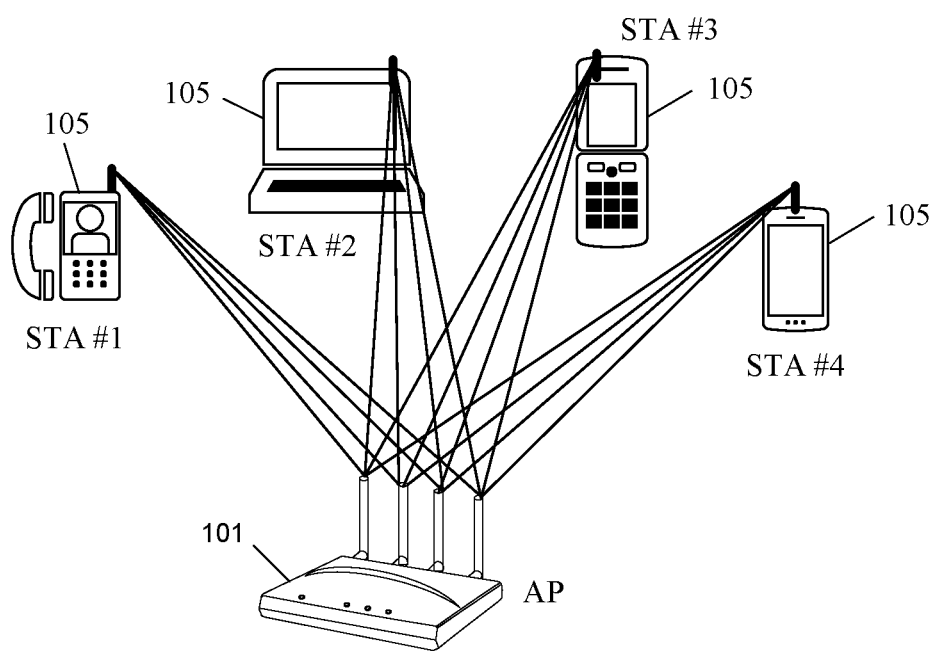
FIG. 1 is a diagram of a system in a typical WLAN deployment scenario.

FIG. 1 is a diagram of a system in a typical WLAN deployment scenario. The system includes one AP 101 and four STAs 105. The AP 101 communicates with a STA #1 105, a STA #2 105, a STA #3 105, and a STA #4 105. Modes of uplink transmission between an AP 101 and a STA 105 include but are not limited to an orthogonal frequency-division multiple access (OFDMA) mode, a multi-user multiple-input multiple-output (MU-MIMO) mode, and an OFDMA and MU-MIMO hybrid transmission mode.

Figure 2:
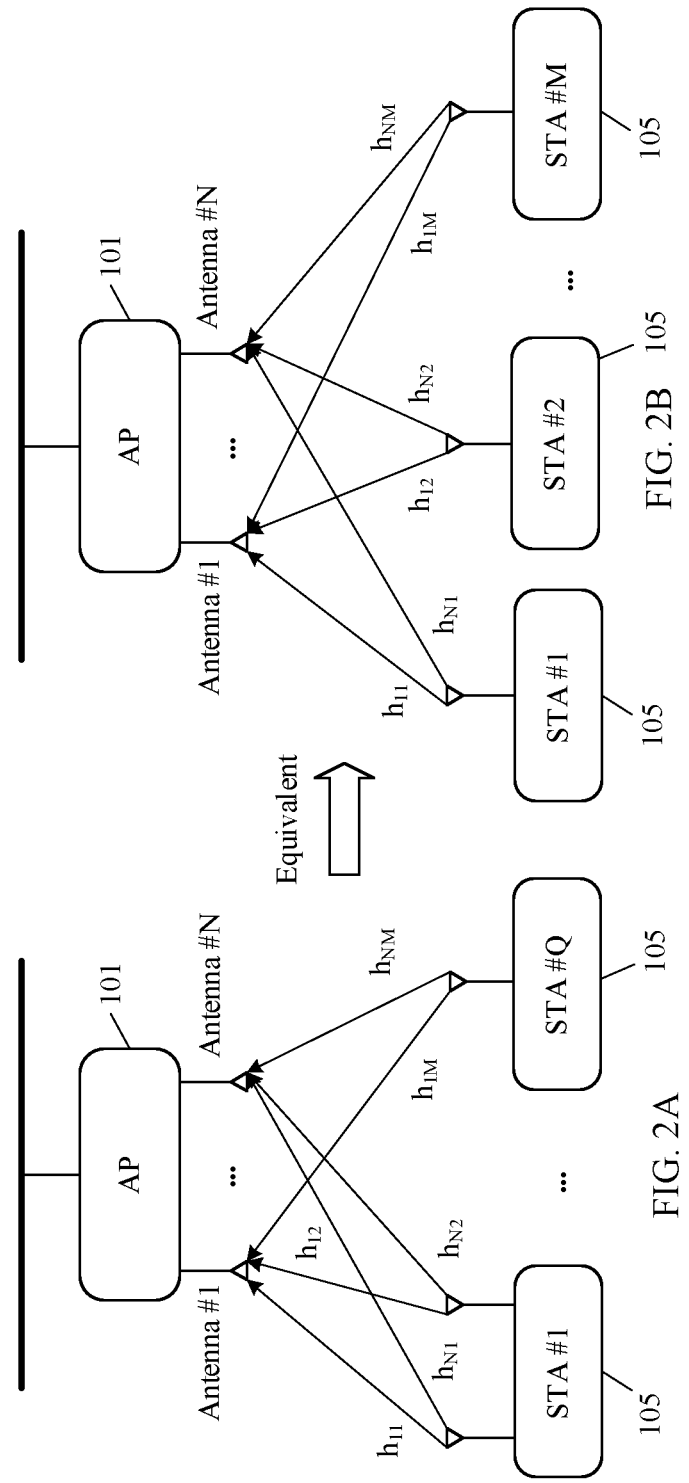
FIG. 2A and FIG. 2B are diagrams of uplink transmission between an AP and STAs in an MU-MIMO mode according to an embodiment of this application.

In this application, a mode of uplink transmission between an AP 101 and a plurality of STAs 105 is an MU-MIMO mode, and a quantity N of AP antennas is required to be greater than or equal to a sum M of antennas of all STAs 105 associated with the AP 101. It should be understood that any STA 105 may include a plurality of antennas. When a STA 105 has two antennas, the STA 105 may be equivalent to two same single-antenna STAs 105, except that channels from the two STAs 105 to the AP 101 are different. FIG. 2A and FIG. 2B are diagrams of uplink transmission between an AP 101 and STAs 105 in an MU-MIMO mode according to an embodiment of this application. In FIG. 2A and FIG. 2B, the AP 101 includes N antennas (an antenna #1 to an antenna #N shown in FIG. 2A and FIG. 2B). A sum of antenna quantities of all STAs 105 is M. $h_{NM}$ in FIG. 2A and FIG. 2B shows a channel between an antenna M on a STA side and an antenna N on an AP side.

FIG. 2A shows that one STA 105 may include a plurality of antennas. If a frequency difference exists between the STA 105 and an AP 101, frequency differences existing between the AP 101 and the plurality of antennas are the same. FIG. 2B is an equivalent transformation of FIG. 2A. A STA 105 including a plurality of antennas may be equivalent to a plurality of same single-antenna STAs 105. It should be understood that this equivalent transformation is merely for easier understanding of the technical solutions provided in this application, and constitutes no limitation on the protection scope of this application.

In addition, the following descriptions are provided to facilitate understanding of the embodiments of this application.

Firstly, in this application, "being used to indicate" may include "being used to directly indicate" and "being used to indirectly indicate". When a piece of indication information is described as being used to indicate A, the indication information may directly indicate A or indirectly indicate A, but it does not necessarily indicate that the indication information carries A.

Information indicated by the indication information is referred to as to-be-indicated information. In an embodiment, the to-be-indicated information may be indicated in a plurality of manners, for example, but not limited to, a manner of directly indicating the to-be-indicated information. For example, the to-be-indicated information is indicated by using the to-be-indicated information or an index of the to-be-indicated information. Alternatively, the to-be-indicated information may be indirectly indicated by indicating other information, and there is an association relationship between the other information and the to-be-indicated information. Alternatively, only a part of the to-be-indicated information may be indicated, and the other part of the to-be-indicated information is already learned of or pre-agreed on. For example, specific information may be alternatively indicated by using an arrangement sequence of a plurality of pieces of information that is pre-agreed on (for example, stipulated in protocols), to reduce indication overheads to some extent. In addition, a common part of all pieces of information may be further identified and indicated in a unified manner, to reduce indication overheads caused by separately indicating same information.

Secondly, "first", "second", and various numerical numbers (for example, "#1", and "#2") shown in this application are merely for ease of description, and are used to distinguish between objects, but are not intended to limit the scope of embodiments of this application. For example, "first" and "second" are used to distinguish between a first group of training sequences and a second group of training sequences, but are not used to describe a particular order or sequence. It should be understood that the objects described in this way are interchangeable in a proper circumstance, so that a solution other than embodiments of this application can be described.

Thirdly, in this application, "preset" may include "predefined", for example, defined in protocols. "Predefined" may be implemented by storing corresponding code or a table in a device (for example, the device includes a STA 105 and an AP 101) in advance, or may be implemented in another manner that may be used to indicate related information. A specific implementation of "predefined" is not limited in this application.

Fourthly, "storage" in embodiments of this application may be storage in one or more memories. The one or more memories may be separately disposed, or may be integrated into an encoder, a decoder, a processor, or a communication apparatus. Alternatively, a part of the one or more memories may be separately disposed, and a part of the one or more memories are integrated into a decoder, a processor, or a communication apparatus. A type of the memory may be a storage medium in any form. This is not limited in this application.

Fifthly, "protocols" in embodiments of this application may be standard protocols in the communication field, for example, may include a Wi-Fi protocol, a new radio (NR) protocol, and a related protocol used for a future communication system. This is not limited in this application.

Sixthly, for ease of understanding, the following briefly describes main parameters in this application.

$h_{ij}$ indicates a channel between an antenna of a STA #j 105 and an antenna #i on an AP side, where i and j are positive integers (this application is described by using a single-antenna STA as an example).

$y_k^l$ indicates a size of data received by an antenna #k on the AP side on a $1^{st}$ symbol, where k and l are positive integers; and $y_i^{j,k}$ indicates information received by an antenna #i on the AP side on a subcarrier k of the $j^{th}$ symbol (one subcarrier is used as an example for description in this application).

$\Delta f_q$ indicates a frequency offset of a STA #q 105 relative to the AP 101.

$e^{j2\pi\Delta f_q*(W-1)*T}$ indicates a phase shift value of the $W^{th}$ training sequence relative to the first training sequence in a training sequence set corresponding to the STA #q 105.

$P_{fix}$ indicates a matrix P corrected based on a frequency offset value between the STA 105 and the AP 101.

$X_h^i$ indicates a size of data sent by a STA #h 105 on the $i^{th}$ symbol.

The uplink multi-user MIMO mainly depends on multi-antenna orthogonal equalization on the AP side, that is, the AP side obtains air-interface link information by using a training sequence (for example, wireless channel state information (CSI)), to equalize effective payloads of the plurality of stations; and distinguish information of each STA 105 from the sum of information of the plurality of stations, so that the stations are orthogonal to each other and do not affect each other. Therefore, whether the wireless channel state information can be accurately obtained affects orthogonality of a plurality of stations in uplink directly or affects accuracy of obtaining a stream by each station, and may also affect accuracy of precoding performed by an access point during downlink data transmission.

However, user terminals have different types, and stations have different radio frequency links. Therefore, carrier frequencies used when the user terminals send signals are hardly consistent, that is, frequency synchronization cannot be implemented between a plurality of stations. A process of obtaining the wireless channel state information may also be referred to as channel estimation.

Figure 3:
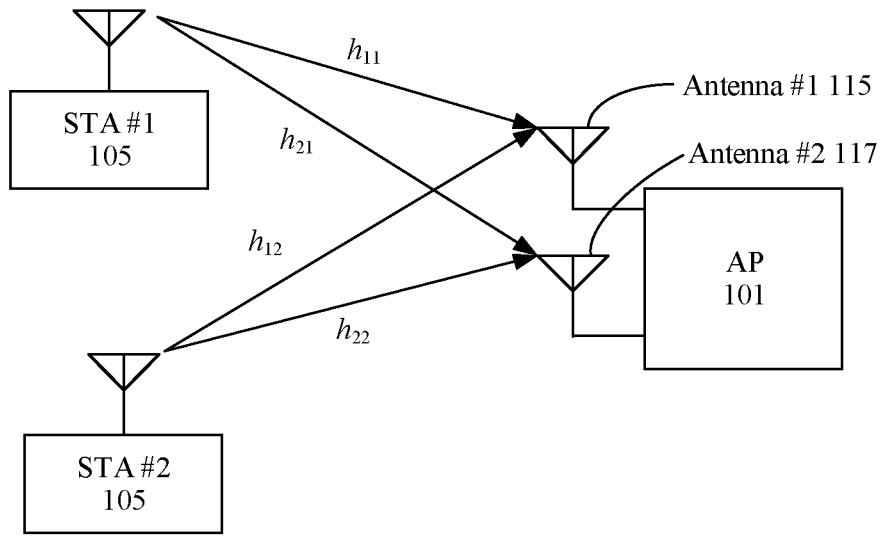
FIG. 3 is a diagram of sending data to an AP by two STAs according to an embodiment of this application.

Firstly, an impact caused by frequency asynchronization of signals sent by a plurality of user terminals on channel estimation on an AP side is briefly described with reference to FIG. 3. FIG. 3 is a diagram of sending data to an AP 101 by two STAs 105 according to an embodiment of this application. Two STAs 105 (a STA #1 105 and a STA #2 105 shown in FIG. 3) and one AP 101 are included in FIG. 3, where the STA #1 105 and the STA #2 105 may access a network by using the AP 101. For example, the STA #1 105 and the STA #2 105 may be two mobile phones that support a Wi-Fi communication function, the AP 101 may be a router with a Wi-Fi chip, and the AP 101 is deployed with two antennas (an antenna #1 115 and an antenna #2 117 shown in FIG. 3).

In an embodiment, there is no frequency difference between the STA #1 105 and the AP 101 or between the STA #2 105 and the AP 101, that is, there is no carrier frequency offset (CFO). In this case, no phase shift occurs on two orthogonal symbols sent by the STA #1 105 and the STA #2 105. The CFO is a frequency offset value for short in the following.

For example, data sent by the STA #1 105 is $X_1=[X_1^1, X_1^2]=[1\ -1]$, and reaches the antenna #1 115 and the antenna #2 117 on the AP side through spatial channels $h_{11}$ and $h_{21}$. Data sent by the STA #2 105 is $X_2=[X_2^1, X_2^2]=[1\ 1]$, and reaches the antenna #1 115 and the antenna #2 117 on the AP side through spatial channels $h_{12}$ and $h_{22}$. Data received by the antenna #1 115 on the AP side is the sum of signals from a STA 105 through air interface channels, and data received by the antenna #2 117 is the sum of signals from a STA 105 through air interface channels. The data received by the antenna #1 115 includes $y_1^1$ and $y_2^2$, where $y_1^1=h_{11}+h_{12}$ and $y_1^2=-h_{11}+h_{12}$. Data received by the antenna #2 117 includes $y_2^1$ and $y_2^2$, where $y_2^1=h_{21}+h_{22}$ and $y_2^2=-h_{21}+h_{22}$. The data sent by the STA 105 in embodiments of this application may be understood as a long training field (LTF) sent by the STA 105 on a subcarrier, and the data in this application may also be understood as a signal.

The AP side can obtain $h_{11}$, $h_{21}$, $h_{12}$, and $h_{22}$, that is, CSI, only by performing a simple mathematical operation on the received data. The foregoing process may be expressed in a matrix manner for better understanding. The data received by the AP 101 is expressed by the following formula:

$$\begin{bmatrix} y_1^1 & y_1^2 \\ y_2^1 & y_2^2 \end{bmatrix} = \begin{bmatrix} h_{11} & h_{12} \\ h_{21} & h_{22} \end{bmatrix}\begin{bmatrix} 1 & -1 \\ 1 & 1 \end{bmatrix}$$

The AP side knows sent training sequence groups, $X_1=[1\ -1]$ and $X_2=[1\ 1]$, that is, a matrix $$\begin{bmatrix} 1 & -1 \\ 1 & 1 \end{bmatrix}$$

in the foregoing formula. The matrix is referred to as a matrix P in the current protocol. Therefore, the AP side can obtain a channel matrix only by performing the following operations on the received data:

$$\begin{bmatrix} y_1^1 & y_1^2 \\ y_2^1 & y_2^2 \end{bmatrix}\begin{bmatrix} 1 & -1 \\ 1 & 1 \end{bmatrix}^{-1} = \begin{bmatrix} h_{11} & h_{12} \\ h_{21} & h_{22} \end{bmatrix}\begin{bmatrix} 1 & -1 \\ 1 & 1 \end{bmatrix}\begin{bmatrix} 1 & -1 \\ 1 & 1 \end{bmatrix}^{-1} = \begin{bmatrix} h_{11} & h_{12} \\ h_{21} & h_{22} \end{bmatrix}$$

In an embodiment, there are a frequency offset between the STA #1 105 and the AP 101 and a frequency offset between the STA #2 105 and the AP 101. For example, the frequency offset of the STA #1 105 relative to the AP 101 is $\Delta f_1$, and the frequency offset of the STA #2 105 relative to the AP 101 is $\Delta f_2$. When the STA 1 105 and the STA 2 105 send data on two consecutive orthogonal symbols, phase shift occurs on the data. It is assumed that a cycle of each symbol is T, that is, a phase of data sent by the STA #1 105 on the second symbol is shifted by $e^{j2\pi\Delta f_1 T}$ relative to a phase of data sent by the STA #1 105 on the first symbol. Similarly, a phase of data sent by the STA #2 105 on the second symbol is shifted by $e^{j2\pi\Delta f_2 T}$ relative to a phase of data sent by the STA #2 105 on the first symbol. In this case, data sent by the STA #1 105 is $X_1=[1\ -1e^{j2\pi\Delta f_1 T}]$, and data sent by the STA #2 105 is $X_2=[1\ 1e^{j2\pi\Delta f_2 T}]$.

The data received by the AP 101 is expressed by the following formula:

$$\begin{bmatrix} y_1^1 & y_1^2 \\ y_2^1 & y_2^2 \end{bmatrix} = \begin{bmatrix} h_{11} & h_{12} \\ h_{21} & h_{22} \end{bmatrix}\begin{bmatrix} 1 & -1e^{j2\pi\Delta f_1 T} \\ 1 & 1e^{j2\pi\Delta f_2 T} \end{bmatrix}$$

On the AP side, data sent by the two STAs 105 still corresponds to the matrix P $$\begin{bmatrix} 1 & -1 \\ 1 & 1 \end{bmatrix}$$

by default. Because the AP side does not know that there is a frequency offset for the STA 105, the AP 101 performs an original operation to obtain:

$$\begin{bmatrix} y_1^1 & y_1^2 \\ y_2^1 & y_2^2 \end{bmatrix}\begin{bmatrix} 1 & -1 \\ 1 & 1 \end{bmatrix}^{-1} = \begin{bmatrix} h_{11} & h_{12} \\ h_{21} & h_{22} \end{bmatrix}\begin{bmatrix} 1 & -1e^{j2\pi\Delta f_1 T} \\ 1 & 1e^{j2\pi\Delta f_2 T} \end{bmatrix}\begin{bmatrix} 1 & -1 \\ 1 & 1 \end{bmatrix}^{-1} =$$

$$\frac{1}{2}\begin{bmatrix} h_{11}(1+e^{j\theta_1})+h_{12}(1-e^{j\theta_2}) & h_{12}(1-e^{j\theta_1})+h_{11}(1-e^{j\theta_2}) \\ h_{21}(1+e^{j\theta_1})+h_{22}(1-e^{j\theta_2}) & h_{22}(1-e^{j\theta_1})+h_{21}(1-e^{j\theta_2}) \end{bmatrix}$$

It may be found that a channel of one of the two STAs 105 is doped with a channel of the other STA 105, causing crosstalk. It can be learned from the foregoing calculation process that this problem is caused by non-orthogonality of the matrix P. That is, it is assumed that frequency offset information of the STA 105 can be learned on the AP side, and the matrix P on the AP side is compensated or corrected, so that the matrix P is a matrix $$P_{fix}\begin{bmatrix} 1 & -1e^{j2\pi\Delta f_1 T} \\ 1 & 1e^{j2\pi\Delta f_2 T} \end{bmatrix}$$

obtained after the frequency offset information is considered, instead of the foregoing $$\begin{bmatrix} 1 & -1 \\ 1 & 1 \end{bmatrix}.$$

Then, a pseudoinverse is calculated based on the matrix $P_{fix}$. In this case, accurate channel information can be obtained.

The foregoing provides detailed description with reference to FIG. 3. When there is a frequency offset between the STA 105 and the AP 101, the AP 101 cannot accurately obtain channel information between the STA 105 and the AP 101 based on the original matrix P. To obtain accurate channel information, the AP 101 needs to obtain the matrix $P_{fix}$ first. Learning of the frequency offset value between the STA 105 and the AP 101 is crucial to obtaining of the matrix $P_{fix}$. The matrix $P_{fix}$ can be obtained by correcting or compensating the matrix P based on the frequency offset value.

Optionally, a same STA 105 sends two pieces of unchanged data on two symbols. In this way, when the two pieces of data are received on the AP side, a frequency offset value between the STA 105 and the AP 101 can be obtained only by comparing a change of the two pieces of data on the two symbols.

Figure 4:
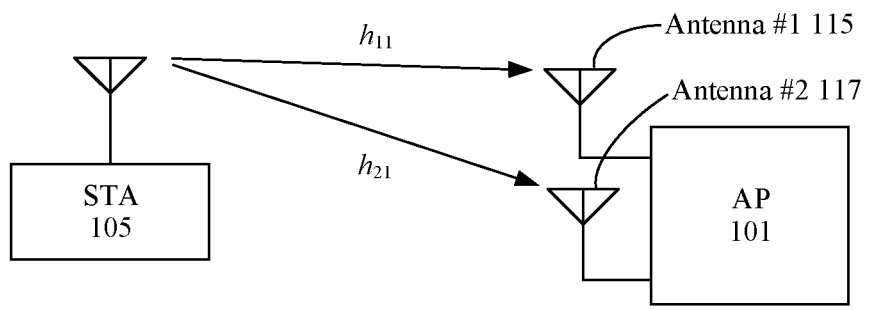
FIG. 4 is a diagram of sending data by a single-antenna STA according to an embodiment of this application.

For example, FIG. 4 is a diagram of sending data by a single-antenna STA 105 according to an embodiment of this application. Data that should be sent by the STA #1 105 is $X_1=[1\ 1]$. Because a frequency offset value between the STA 105 and an AP 101 is $\Delta f_1$, it is equivalent to that sent data is $X_1=[1\ 1e^{j2\pi\Delta f_1 T}]$. In this case, data received by an antenna #1 115 of the AP 101 on two consecutive symbols is $[y_1^1\ y_1^2]=[h_{11}\ h_{11}e^{j2\pi\Delta f_1 T}]$. Point division or conjugation is performed on the data that is received on the two symbols, to obtain an angle. In this case, the angle $2\pi\Delta f_1 T$ at which the two pieces of data are shifted relative to each other can be obtained, to further calculate $\Delta f_1$.

However, when a plurality of STAs 105 send data in uplink, data received on the AP side is the sum of data sent by the plurality of STAs 105, and information cannot be distinguished. Even if repeated data is sent, because the data on two symbols is the sum of the data from the plurality of STAs 105, a frequency offset value for each STA 105 cannot be accurately estimated, and channels of the STA 105 cannot be orthogonalized, resulting in crosstalk between STAs 105.

Optionally, it is considered that channels within orthogonal blocks of consecutive subcarriers are roughly equal within the measured Wi-Fi bandwidth, that is, the channels are flat channels. Different orthogonal sequences are allocated to subcarriers for sending by the STAs 105, so that the AP 101 side can split channel information of the STAs 105 to obtain an inter-symbol phase shift angle.

Figure 5:
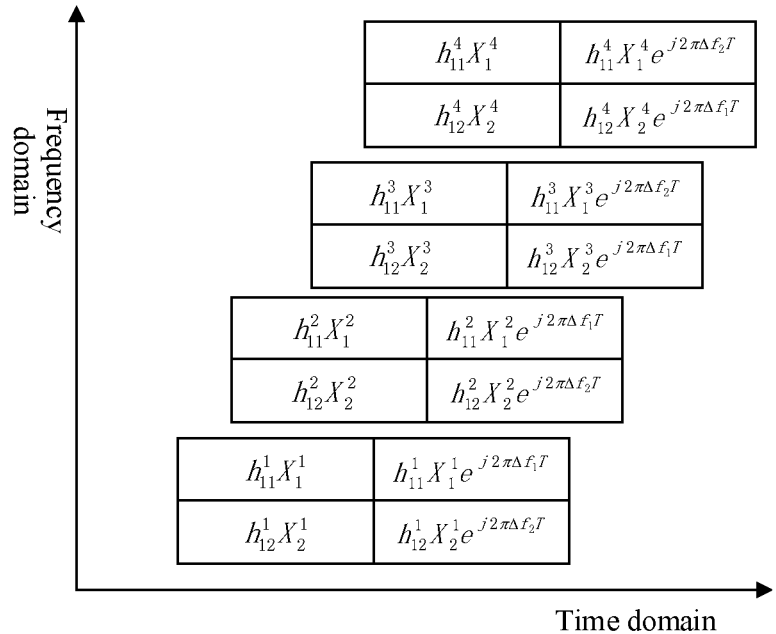
FIG. 5 is a diagram of orthogonal sequences respectively corresponding to a plurality of STAs according to an embodiment of this application.

For example, FIG. 5 is a diagram of orthogonal sequences respectively corresponding to a plurality of STAs according to an embodiment of this application. Data sent by a STA #1 on each subcarrier of the first symbol is $X_1=[X_1^1\ X_1^2\ X_1^3\ X_1^4]$; and data sent by a STA #2 on each subcarrier of the first symbol is $X_1=[X_2^1\ X_2^2\ X_2^3\ X_2^4]$. Because an orthogonal sequence is allocated to a subcarrier for sending by each STA, $$X_1(X_2)^T = \sum_{i=1}^{4} X_1^i X_2^i = 0$$

An antenna #1 is used as an example on the AP side. Data received on subcarriers of the first symbol may be expressed as follows:

$$y_1^{1,1} = h_{11}^1 X_1^1 + h_{12}^1 X_2^1$$
$$y_1^{1,2} = h_{11}^2 X_1^2 + h_{12}^2 X_2^2$$
$$y_1^{1,3} = h_{11}^3 X_1^3 + h_{12}^3 X_2^3$$
$$y_1^{1,4} = h_{11}^4 X_1^4 + h_{12}^4 X_2^4$$

Because the prerequisite is that the channels within the consecutive subcarrier orthogonal blocks are nearly equal, $h_{11}^1=h_{11}^2=h_{11}^3=h_{11}^4=h_{11}$, and $h_{12}^1=h_{12}^2=h_{12}^3=h_{12}^4=h_{12}$.

This method is applied to the orthogonal blocks by analogy. There are 234 subcarriers 802.11ax in which consecutive subcarriers need to be flat. When the foregoing prerequisite is met, received signals are orthogonalized. For example, signals from the STA #2 are orthogonalized, orthogonal summation is performed on signals received by the antenna #1 of the AP side on each subcarrier of the first symbol:

$$\sum_{i=1}^{4} y_1^{1,i} X_1^i = \sum_{i=1}^{4} (h_{11} X_1^i + h_{12} X_2^i) X_1^i = h_{11}\sum_{i=1}^{4}(X_1^i)^2 + h_{12}\sum_{i=1}^{4} X_2^i X_1^i$$

Because $\sum_{i=1}^{4} X_1^i X_2^i = 0$, $h_{12}\sum_{i=1}^{4} X_2^i X_1^i = 0$. The signals from the STA #2 may be eliminated, and only information from the STA #1 is retained. That is, $$\sum_{i=1}^{4} y_1^{1,i} X_1^i = h_{11}\sum_{i=1}^{4}(X_1^i)^2$$

Similarly, for the second symbol, the AP side may perform the same processing as the foregoing to obtain:

$$\sum_{i=1}^{4} y_1^{2,i} X_1^i = h_{11} e^{j2\pi\Delta f_1 T}\sum_{i=1}^{4}(X_1^i)^2$$

$2\pi\Delta f_1 T$ may be calculated in combination with $\sum_{i=1}^{4} y_1^{1,i} X_1^i = h_{11}\sum_{i=1}^{4}(X_1^i)^2$ and $\sum_{i=1}^{4} y_1^{2,i} X_1^i = h_{11} e^{j2\pi\Delta f_1 T}\sum_{i=1}^{4}(X_1^i)^2$.

However, the foregoing prerequisite that the channels within the orthogonal blocks of the consecutive subcarriers are nearly equal is a harsh condition, and is difficult to meet in practice. As a result, channel estimation precision is difficult to be ensured.

To resolve the foregoing disadvantage of channel estimation, this application provides an uplink multi-station channel estimation method. A plurality of training sequence groups used for channel estimation are sent, to improve channel estimation accuracy.

It should be understood that the method provided in embodiments of this application may be applied to a WLAN communication system, for example, a communication system 100 shown in FIG. 1. The communication system may include at least one AP and a plurality of STAs. Frequency offsets between the plurality of STAs and the AP are inconsistent.

A single-antenna STA is used as an example for description in embodiments of this application. To be specific, one AP is associated with a plurality of single-antenna STAs. When a STA includes a plurality of antennas, frequency offsets between the antennas and an antenna of the AP are similar. Therefore, for a manner of calculating channel information between another antenna of the STA and the antenna of the AP, refer to a manner of calculating channel information between an antenna of the STA and the antenna of the AP in embodiments of this application. Details are not described in this application again.

It should be further understood that the uplink multi-station channel estimation method provided in embodiments of this application may be further applied to a scenario of a plurality of APs. For example, the system in the WLAN deployment scenario shown in FIG. 1 further includes another AP. Communication between the another AP and the STA is similar to that between the AP shown in FIG. 1 and the STA. For channel estimation between the another AP and the STA, refer to channel estimation between the AP and the STA shown in FIG. 1. Details are not described in this application.

It should be further understood that data transmission between the STA and the AP may occur on full bandwidth (for example, 20-megabit bandwidth, including 256 subcarriers). In embodiments of this application, channel estimation between the STA and the AP on one subcarrier is used as an example for description. Other subcarriers are similar. Details are not described in this application again.

It should be further understood that a structure of an execution body of the method provided in embodiments of this application is not specially limited in the following embodiments, provided that a program that records code for the method provided in embodiments of this application can be run to perform communication according to the method provided in embodiments of this application. For example, the method provided in embodiments of this application may be performed by an AP or a STA, or a functional module of the AP or the STA that can invoke and execute the program.

Without loss of generality, the following describes in detail an uplink multi-station channel estimation method provided in an embodiment of this application by using interaction between an AP and a STA as an example.

Figure 6:
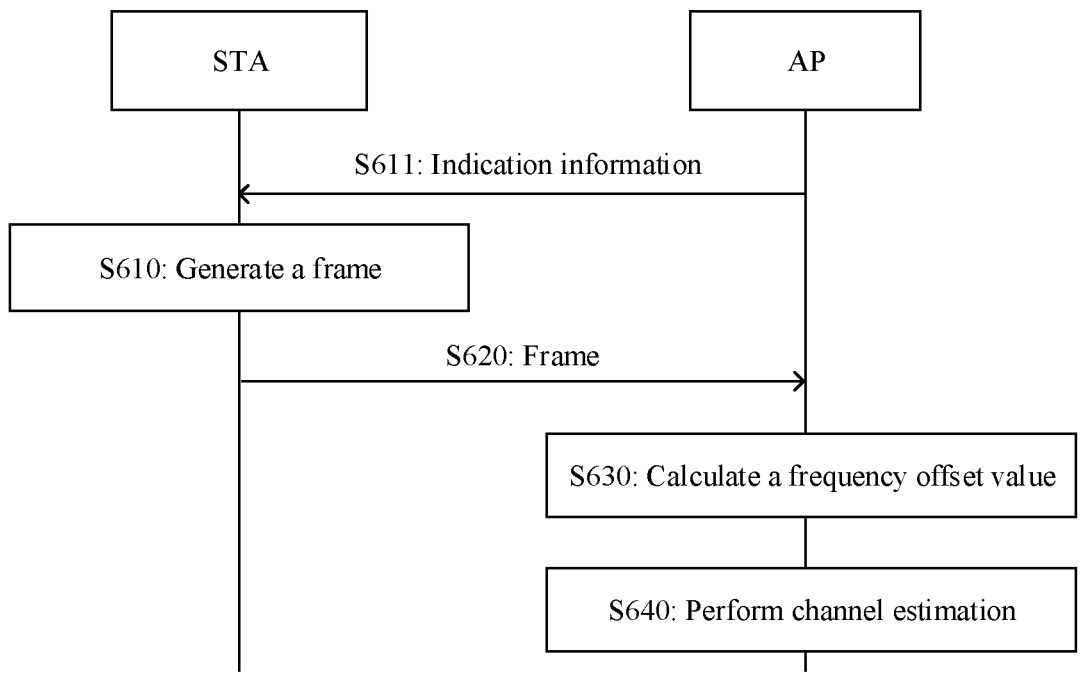
FIG. 6 is a flowchart of an uplink multi-station channel estimation method according to an embodiment of this application.

FIG. 6 is a flowchart of an uplink multi-station channel estimation method according to an embodiment of this application. Execution bodies include an AP and a STA. For ease of understanding, FIG. 6 shows only one STA. Actually, in embodiments of this application, a plurality of STAs are associated with the AP shown in FIG. 6, and are not shown in the figure.

The uplink multi-station channel estimation method includes a part or all of the following steps.

S610: The STA generates a frame.

The frame includes a first group of training sequences and a second group of training sequences, and the first group of training sequences and the second group of training sequences are used for calculating a frequency offset value between the STA and the access point AP. The calculated frequency offset value may be used for channel estimation.

Optionally, the frame in this application may be a data frame, a control frame, or the like. A frame type is not limited in this application provided that the frame type includes the foregoing first group of training sequences and the foregoing second group of training sequences.

It should be understood that, in embodiments of this application, that the two groups of training sequences included in the frame are referred to as the first group of training sequences and the second group of training sequences is merely an example, and constitutes no limitation on the protection scope of this application. For example, the two groups of training sequences may also be referred to as a first training sequence block and a second training sequence block, a first training sequence set and a second training sequence set, or the like. The first group of training sequences includes one or more first training sequences, and the second group of training sequences includes one or more second training sequences.

It should be further understood that, in embodiments of this application, the frame may further include more than two training sequence groups. For example, the frame further includes a third training sequence group and a fourth training sequence group. Examples are no longer provided one by one herein.

The STA is any one of the plurality of STAs associated with the AP. It should be understood that frequency offset values between the plurality of STAs and the AP are different, and each of the plurality of STAs generates its own training sequence and includes the training sequence in the frame.

In an implementation, the first group of training sequences is obtained by multiplying a preset training sequence by an element that corresponds to the STA and that is in a matrix P, and the second group of training sequences is obtained by multiplying the preset training sequence by an element that corresponds to the STA and that is in a matrix P or a matrix P1. The matrix P1 is a matrix determined based on a preset phase identification matrix, and the matrix P is a matrix that is known to the AP and the foregoing plurality of STAs and that is used for channel estimation.

Optionally, before the STA generates the frame, the STA receives indication information sent by the AP. The indication information is used to indicate the STA to generate the frame. In this case, a procedure of the method shown in FIG. 6 further includes S611: The AP separately sends indication information to the plurality of STAs.

For example, the AP communicates with two STAs (a STA #1 and a STA #2). The AP sends indication information #1 to the STA #1, where the indication information #1 is used to indicate the STA #1 to generate a frame #1, and two groups of training sequences included in the frame #1 are used to estimate a channel from the STA #1 to the AP. The AP sends indication information #2 to the STA #2, where the indication information #2 is used to indicate the STA #2 to generate a frame #2, and two groups of training sequences included in the frame #2 are used to estimate a channel from the STA #1 to the AP. The indication information #1 and the indication information #2 may be a same piece of information, but correspond to different receive ends.

Optionally, the indication information may be included in a repeat channel estimation announcement (RCEA) frame. The RCEA frame may be a newly defined frame, or a trigger frame specified in a current protocol may be reused as the RCEA frame. It should be understood that a name of the frame including the indication information is not limited in embodiments of this application. The frame may be referred to as the foregoing RCEA frame, or may have another name. Examples are not described herein one by one.

In an embodiment, the RCEA frame includes 1-bit indication information. A bit 0 indicates using a channel estimation method specified in the current protocol, and a bit 1 indicates using a Re-CE channel estimation training sequence. The 1-bit indication information may be referred to as a Re-CE field in the RCEA frame. Table 1 describes definition of the Re-CE field.

TABLE 1

| Bit information | Description about repeat channel estimation |
| --- | --- |
| 0 | Follow a legacy MU-MIMO LTF mode (follow legacy MU-MIMO LTF mode) |
| 1 | Repeat channel estimation training sequence mode (Re-CE training sequence mode) |

Alternatively, the bit 1 indicates using the channel estimation method specified in the current protocol, and the bit 0 indicates using the Re-CE channel estimation training sequence.

Alternatively, the RCEA frame includes 2-bit indication information. For example, 00 and 11 indicate using the channel estimation method specified in the current protocol, and 01 and 10 indicate using the Re-CE channel estimation training sequence.

Alternatively, the RCEA frame includes indication information including more than two bits. Examples are not described herein in this application one by one.

It should be understood that 1-bit indication information may be included in the RCEA frame in consideration of information overheads.

It should further be understood that, in this application, that the frame carrying the indication information is referred to as an RCEA frame is merely an example, and constitutes no limitation on the protection scope of this application. For example, the frame may also be referred to as a trigger frame, an announcement frame, an indication frame, or the like, provided that the frame includes the foregoing indication information.

In an embodiment, the indication information may be further used to indicate whether the preset phase identification matrix is used in a process in which the STA generates a frame.

For example, the RCEA frame further includes 1-bit indication information, a bit 0 indicates using the preset phase identification matrix, and a bit 1 indicates not using the preset phase identification matrix.

In an embodiment, the indication information may be further used to indicate an arrangement mode of the first group of training sequences and the second group of training sequences generated by the STA in the frame.

For example, the RCEA frame further includes 1-bit indication information, a bit 0 indicates that the first group of training sequences and the second group of training sequences are adjacently arranged in the frame, and a bit 1 indicates that the first group of training sequences and the second group of training sequences are alternately arranged at an equal interval in the frame.

For example, the RCEA frame further includes 2-bit indication information, where one bit (the first bit) in the two bits is used to indicate the arrangement mode of the first group of training sequences and the second group of training sequences in the frame. Optionally, a value of the first bit is 0, indicating that the first group of training sequences and the second group of training sequences are adjacently arranged in the frame, and the value of the first bit is 1, indicating that the first group of training sequences and the second group of training sequences are alternately arranged at an equal interval in the frame. The other bit (the second bit) in the two bits is used to indicate an interval at which the first group of training sequences and the second group of training sequences are alternately arranged at an equal interval in the frame.

Optionally, the value of the second bit is 0, indicating that the interval at which the first group of training sequences and the second group of training sequences are alternately arranged at an equal interval in the frame is 1. Optionally, the value of the second bit is 1, indicating that the interval at which the first group of training sequences and the second group of training sequences are alternately arranged at an equal interval in the frame is 2.

It should be understood that indication information indicating whether to generate the frame, the indication information indicating whether to use the preset phase identification matrix, the indication information indicating the arrangement mode of the first group of training sequences and the second group of training sequences in the frame, and the indication information indicating the interval at which the first group of training sequences and the second group of training sequences are alternately arranged at an equal interval may be sent separately. For example, the AP sends first indication information, second indication information, third indication information, and fourth indication information to the STA. The first indication information is used to indicate whether to generate the frame, the second indication information is used to indicate whether to use the preset phase identification matrix, the third indication information is used to indicate the first group of training sequences and the second group of training sequences, and the fourth indication information is used to indicate the interval at which the first group of training sequences and the second group of training sequences are alternately arranged at an equal interval. A sequence of sending the first indication information, the second indication information, and the third indication information is not limited in this application. However, from a perspective of small signaling overheads, the AP may use the foregoing manner to complete to-be-indicated content by using one piece of indication information.

Further, after receiving the RCEA frame, the STA views the Re-CE field in the RCEA frame, and determines whether a channel estimation procedure needs to be completed currently by using the Re-CE training sequence. Optionally, if bit information of the Re-CE field is 1, the STA determines to generate the frame including the first group of training sequences and the second group of training sequences. Optionally, if the bit information of the Re-CE field is 0, the STA determines to complete channel estimation based on the known matrix P without generating the frame.

The generating, by the STA, a frame includes the following content:

In embodiments of this application, single-antenna STAs are used as an example for description. A STA learns of its own number and a total quantity of STAs. A total quantity M of antennas of a plurality of STAs (because single antennas are used as an example, the total quantity M of antennas may be understood as the total quantity M of STAs) is used to determine a dimension of the matrix P and a quantity Q of training sequences separately included in the first group of training sequences and the second group of training sequences. It should be understood that the STA is not necessarily a single-antenna STA in embodiments of this application. When a STA has a plurality of antennas, refer to a plurality of equivalent single-antenna STAs shown in FIG. 2A and FIG. 2B. That each single-antenna STA generates the frame should be understood as that the STA with a plurality of antennas generates frames corresponding to the antennas.

For example, a STA #1 has two antennas (an antenna #1 and an antenna #2), and a STA #2 has two antennas (an antenna #3 and an antenna #4). In this case, the STA #1 generates a frame #1 and a frame #2 respectively corresponding to the antenna #1 and the antenna #2, and the STA #2 generates a frame #3 and a frame #4 respectively corresponding to the antenna #3 and the antenna #4. When the STA #1 generates the frame #1 corresponding to the antenna #1, the STA #1 determines that the antenna #1 is the first antenna and that there are a total of four antennas. When the STA #1 generates the frame #2 corresponding to the antenna #2, the STA #1 determines that the antenna #2 is the second antenna and that there are a total of 4 antennas. From the perspective of equivalence, the STA #1 is equivalent to a STA #1_1 (having an antenna #1) and a STA #1_2 (having an antenna #2), and a STA #2 is equivalent to a STA #2_1 (having an antenna #3) and a STA #2_2 (having an antenna #4). The STA #1_1 generates the frame #1 corresponding to the antenna #1, the STA #1_2 generates the frame #2 corresponding to the antenna #2, the STA #2_1 generates the frame #3 corresponding to the antenna #3, and the STA #2_2 generates the frame #4 corresponding to the antenna #4. When the STA #1_1 generates the frame #1 corresponding to the antenna #1, the STA #1_1 determines that the STA #1_1 is the first STA and that there are a total of four STAs.

For ease of understanding, the following uses single-antenna STAs as an example for description. A total quantity M of antennas is equal to a total quantity of STAs, and a sequence of an antenna in all antennas is a sequence of a single-antenna STA having the antenna in all STAs.

Refer to a mapping relationship between M and Q in the current protocol, as shown in Table 2.

TABLE 2

| M | Dimension of a matrix P/<br>Training sequence quantity Q |
|---|---|
| 1 | 1 |
| 2 | 2 |
| 3 | 4 |
| 4 | 4 |
| 5 | 6 |
| 6 | 6 |
| 7 | 8 |
| 8 | 8 |

For the foregoing mapping relationship between M and Q, reference may also be made to a mapping relationship between M and Q specified in a new protocol after development of communication technologies. M shown in Table 2 may be a total quantity of antennas of a plurality of STAs. However, it should be understood that M is not limited in this application to be only the total quantity of antennas of the plurality of STAs. For example, M may be alternatively understood as a value related to the total quantity of antennas of the plurality of STAs, or a value determined based on the total quantity of antennas of the plurality of STAs.

Ranking of a STA in the STAs is used to determine that training sequences in the first group of training sequences and the second group of training sequences of the STA are obtained by multiplying the preset training sequence by an element in a specific row of the matrix P. The preset training sequence may be obtained by orthogonally spreading long training sequences (LTS) or LTFs in preambles of existing data frames in frequency domain. Each STA has its own spread sequence, and spread sequences of the STAs are orthogonal to each other. A Walsh matrix, the existing matrix P, or the like may be used in orthogonal spreading on the long training sequence as long as orthogonality is satisfied.

For example, if there are a total of four STAs, one 4×4 matrix is selected for the matrix P, and four training sequences are required in the first group of training sequences. For the first STA in the four STAs, the four training sequences are respectively multiplied by four elements corresponding to the first row of the matrix P, to obtain the first group of training sequences. This method is applied to the second to the fourth STAs in the four STAs by analogy. Details are not described herein again. The four STAs may also be considered as two STAs each having two antennas. In this case, one 4×4 matrix is still selected for the matrix P, and four training sequences are required in the first group of training sequences. For the first antenna in the four antennas, the four training sequences are respectively multiplied by four elements corresponding to the first row of the matrix P, to obtain the first group of training sequences. This method is applied to the second to the fourth STAs in the four STAs by analogy. Details are not described in the following for a case in which a STA has a plurality of antennas.

After the first group of training sequences is generated, same processing is performed for the second group of training sequences, and then the generated first group of training sequences and the generated second group of training sequences are arranged in a frame in a specific sequence and sent to the AP. The first group of training sequences generated by the STA #1 includes Q training sequences (preset training sequence $\times P_{11}$, preset training sequence $\times P_{12}$, ..., and preset training sequence $\times P_{1Q}$). The second group of training sequences includes Q training sequences (preset training sequence $\times P_{21}$, preset training sequence $\times P_{22}$, ..., and preset training sequence $\times P_{2Q}$). The first group of training sequences occupies Q first locations in the frame, and the second group of training sequences occupies Q second locations in the frame.

In an embodiment, the Q first locations and the Q second locations are sequentially arranged in the frame. That is, the first group of training sequences and the second group of training sequences generated by the STA are sequentially and adjacently arranged in the frame, as shown in FIG. 7A. FIG. 7A to FIG. 7C are diagrams depicting frames according to this embodiment of this application.

It can be seen from FIG. 7A that the Q training sequences included in the first group of training sequences are arranged as a whole before the Q training sequences included in the second group of training sequences.

In an embodiment, the Q first locations and the Q second locations are alternately and adjacently arranged in the frame. That is, training sequences included in the first group of training sequences and the second group of training sequences generated by the STA are alternately and adjacently arranged in the frame, as shown in FIG. 7B. It can be seen from FIG. 7B that Q training sequences included in the first group of training sequences and the Q training sequences included in the second group of training sequences are arranged at an interval of one training sequence.

In an embodiment, the Q first locations and the Q second locations are alternately arranged at an equal interval in the frame. That is, the training sequences included in the first group of training sequences and the second group of training sequences generated by the STA are alternately arranged at an equal interval in the frame, as shown in FIG. 7C. It can be seen from FIG. 7C that the Q training sequences included in the first group of training sequences and the Q training sequences included in the second group of training sequences are arranged at an interval of two training sequences.

It should be understood that, in this embodiment of this application, when the Q first locations and the Q second locations are alternately arranged at an equal interval in the frame, the first locations and the second locations may be alternately arranged one by one as shown in FIG. 7B, the first locations and the second locations may be alternately arranged two by two as shown in FIG. 7C, or the first locations and the second locations may be alternately arranged N by N (N is less than Q). Details are not described in this application. A specific interval manner in which the first group of training sequences and the second group of training sequences are alternately arranged at an equal interval may be designed based on frequency offset values for different STAs that can be identified by the AP side.

Optionally, phase identification information may be added to the second group of training sequences, to more accurately distinguish between the different STAs corresponding to the calculated frequency offset values. That is, the second group of training sequences is obtained by multiplying the preset training sequence by an element that corresponds to the STA and that is in the matrix P1.

In an embodiment, the matrix P1 is a matrix obtained by left-multiplying the preset phase identification matrix to the matrix P.

In an embodiment, the matrix P1 is a preset phase identification matrix that has a phase identification function.

It should be understood that a specific form of the matrix P1 is not limited in embodiments of this application.

For ease of understanding a procedure in which the STA generates the frame, an example in which two STAs communicate with an AP is used below for description.

A STA #1 receives an RCEA frame #1 sent by the AP, and determines, based on a bit value (for example, the bit value is 1) of a Re-CE field in the RCEA frame #1, to generate the frame #1.

The STA #1 learns, based on information in the RCEA frame #1, that the STA #1 is the first STA and that there are currently two STAs performing uplink MU-MIMO simultaneously. It should be understood that, in embodiments of this application, how the STA learns of a total quantity of STAs performing uplink MU-MIMO simultaneously and a sequence of the STA in the STAs are not limited, which may be specified in the current protocol or in a solution existing after development of a future Wi-Fi technology.

According to Table 2, when there are a total of two STAs, the first group of training sequences generated by the STA #1 should include two training sequences, and a dimension of the matrix P is 2. In this application, it is assumed that the matrix P is $$\begin{bmatrix} 1 & -1 \\ 1 & 1 \end{bmatrix}.$$

The two training sequences are respectively multiplied by two elements in the first row of the matrix P, that is, [1 −1]. The first training sequence in the two training sequences is multiplied by 1, and the second training sequence in the two training sequences is multiplied by −1. A procedure of generating the second group of training sequences by the STA #1 is similar to that of generating the first group of training sequences. Details are not described herein again.

Similarly, the STA #2 receives an RCEA frame #2 sent by the AP, and determines, based on a bit value of a Re-CE field in the RCEA frame #2, to generate the frame #2.

The STA #2 learns, based on information in the RCEA frame #2, that the STA #2 is the second STA and that there are currently two STAs performing uplink MU-MIMO simultaneously.

According to Table 2, when there are a total of two STAs, the first group of training sequences generated by the STA #2 should include two training sequences, and a dimension of the matrix P is 2. In this application, it is assumed that the matrix P is $$\begin{bmatrix} 1 & -1 \\ 1 & 1 \end{bmatrix}.$$

The two training sequences are respectively multiplied by two values in the second row of the matrix P, that is, [1 1]. The first training sequence in the two training sequences is multiplied by 1, and the second training sequence in the two training sequences is multiplied by 1. A procedure of generating the second group of training sequences by the STA #2 is similar to that of generating the first group of training sequences. Details are not described herein again.

In an embodiment, the STA #1 and the STA #2 sequentially adjacently arrange the generated first group of training sequences and the generated second group of training sequences into respective to-be-sent frames, as shown in FIG. 8A. FIG. 8A and FIG. 8B are diagrams depicting frames generated by the two STAs according to this embodiment of this application.

In an embodiment, training sequences included in the first group of training sequences and the second group of training sequences generated by the STA #1 are alternately arranged in a to-be-sent frame. Training sequences included in the first group of training sequences and the second group of training sequences generated by the STA #2 are alternately arranged in a to-be-sent frame, as shown in FIG. 8B.

Optionally, phase identification information may be added to the second group of training sequences to more accurately distinguish between different STAs. For example, when the STA #1 generates the second group of training sequences, a phase identification matrix $P_{Phase\_identify}$ is introduced. $P_{Phase\_identify}$ may be generated based on the matrix P. For example, $$P_{Phase\_identify} = P_{Phaseshift} \times P = \begin{bmatrix} e^{j^* phaseshift1} & 0 \\ 0 & e^{j^* phaseshift\ 2} \end{bmatrix} \begin{bmatrix} 1 & -1 \\ 1 & 1 \end{bmatrix}$$

When the second group of training sequences is generated, the foregoing two training sequences are multiplied by two elements in the first row of $P_{Phase\_identify}$.

Further, after generating the first group of training sequences and the second group of training sequences, the STA sends the first group of training sequences and the second group of training sequences to the AP. The STA sends the frame to the AP. The frame includes the generated first group of training sequences and the generated second group of training sequences. That is, the method procedure shown in FIG. 6 further includes S620: The STA sends the frame to the AP.

The sending, by the STA, the frame to the AP may be that the M STAs simultaneously send the frame after a specified time interval. In addition, the frame sent by each of the STAs includes the first group of training sequences and the second group of training sequences generated by the STA. It should be understood that the specified time interval is not limited in this application.

It should be understood that each of the M STAs sends a frame to the AP. The frame sent by each of the STAs includes a first group of training sequences and a second group of training sequences generated by the STA. It can be seen from FIG. 7A to FIG. 7C that the first group of training sequences and the second group of training sequences generated by the STA may be arranged in the frame in a plurality of different modes. In this case, the frame received by the AP may be in a plurality of possible forms shown in FIG. 7A to FIG. 7C.

The M first groups of training sequences included in the M frames respectively sent by the M STAs are sent to the AP through channels between the M STAs and the AP, and the AP side receives a first information matrix. Similarly, the M second groups of training sequences included in the M frames respectively sent by the M STAs are sent to the AP through channels between the M STAs and the AP, and the AP receives a second information matrix. The first information matrix and the second information matrix are used for calculating the frequency offset values between the M STAs and the AP.

For ease of understanding, the first information matrix may be expressed as a product of a training sequence matrix including the M first groups of training sequences and a channel information matrix including channel information between the AP and the M STAs. The second information matrix may be expressed as a product of a training sequence matrix including the M second groups of training sequences and a channel information matrix including channel information between the AP and the M STAs.

It should be understood that, in embodiments of this application, that the matrix including the channel information between the AP and the M STAs is referred to as a channel information matrix is merely an example, and constitutes no limitation on the protection scope of this application. For example, the channel information matrix may also be referred to as a channel estimation matrix, a channel matrix, or the like.

Further, the AP can calculate the frequency offset values between the M STAs and the AP. That is, the method procedure shown in FIG. 6 further includes S630: The AP calculates the frequency offset values. According to the uplink multi-station channel estimation method provided in this embodiment of this application, the AP calculates the frequency offset values in the following several possible cases:

Case 1:

FIG. 7A shows the frames sent by the M STAs and received by the AP. Irrespective of a frequency offset between each of the M STAs and the AP, the first information matrix may be expressed as:

$$\begin{bmatrix} y_1^1 & y_1^2 & \cdots & y_1^Q \\ y_2^1 & y_2^2 & \cdots & y_2^Q \\ \vdots & \vdots & \cdots & \vdots \\ \vdots & \vdots & & \vdots \\ y_N^1 & y_N^2 & \cdots & y_N^Q \end{bmatrix} = \quad \text{(Formula 1-1)}$$

$$\begin{bmatrix} h_{11} & h_{12} & \cdots & h_{1M} \\ h_{21} & h_{22} & \cdots & h_{2M} \\ \vdots & \vdots & \cdots & \vdots \\ \vdots & \vdots & & \vdots \\ h_{N1} & h_{N2} & \cdots & h_{NM} \end{bmatrix} \begin{bmatrix} P_{11} & P_{12} & \cdots & P_{1Q} \\ P_{21} & P_{22} & \cdots & P_{2Q} \\ \vdots & \vdots & \cdots & \vdots \\ \vdots & \vdots & & \vdots \\ P_{M1} & P_{M2} & \cdots & P_{MQ} \end{bmatrix}$$

However, in embodiments of this application, it is mainly considered that different frequency offsets exist between the M STAs and the AP. For example, the frequency offsets between the M STAs and the AP are $\Delta f_1, \Delta f_2, \ldots,$ and $\Delta f_M$, due to a frequency offset, a phase of a training sequence sent by each of the M STAs on each symbol after the first symbol is an accumulated phase shift value relative to a phase of training sequence sent on the first symbol. Therefore, a phase shift angle of a training sequence sent on a symbol Q relative to the training sequence sent on the first symbol is $j2\pi\Delta f(Q-1)T$. In this case, the first information matrix is expressed as:

$$\begin{bmatrix} y_1^1 & y_1^2 & \cdots & y_1^Q \\ y_2^1 & y_2^2 & \cdots & y_2^Q \\ \vdots & \vdots & \cdots & \vdots \\ \vdots & \vdots & & \vdots \\ y_N^1 & y_N^2 & \cdots & y_N^Q \end{bmatrix} = \begin{bmatrix} h_{11} & h_{12} & \cdots & h_{1M} \\ h_{21} & h_{22} & \cdots & h_{2M} \\ \vdots & \vdots & \cdots & \vdots \\ \vdots & \vdots & & \vdots \\ h_{N1} & h_{N2} & \cdots & h_{NM} \end{bmatrix} \quad \text{(Formula 1-2)}$$

$$\begin{bmatrix} P_{11} & P_{12}e^{j2\pi\Delta f_1 T} & \cdots & P_{1Q}e^{j2\pi\Delta f_1(Q-1)T} \\ P_{21} & P_{22}e^{j2\pi\Delta f_2 T} & \cdots & P_{2Q}e^{j2\pi\Delta f_2(Q-1)T} \\ \vdots & & \cdots & \vdots \\ \vdots & & & \vdots \\ P_{M1} & P_{M2}e^{j2\pi\Delta f_M T} & \cdots & P_{MQ}e^{j2\pi\Delta f_M(Q-1)T} \end{bmatrix} =$$

$$H * P_{fix}$$

Similarly, the second information matrix is expressed as:

$$\begin{bmatrix} y_1^{Q+1} & y_1^{2Q+} & \cdots & y_1^{2Q} \\ y_2^{Q+1} & y_2^{Q+2} & \cdots & y_2^{2Q} \\ \vdots & \vdots & \cdots & \vdots \\ \vdots & \vdots & & \vdots \\ y_N^{Q+1} & y_N^{Q+2} & \cdots & y_N^{2Q} \end{bmatrix} = \begin{bmatrix} h_{11} & h_{12} & \cdots & h_{1M} \\ h_{21} & h_{22} & \cdots & h_{2M} \\ \vdots & \vdots & \cdots & \vdots \\ \vdots & \vdots & & \vdots \\ h_{N1} & h_{N2} & \cdots & h_{NM} \end{bmatrix}$$

$$\begin{bmatrix} P_{11}e^{j2\pi\Delta f_1 QT} & P_{12}e^{j2\pi\Delta f_1(Q+1)T} & \cdots & P_{1Q}e^{j2\pi\Delta f_1(2Q-1)T} \\ P_{21}e^{j2\pi\Delta f_2 QT} & P_{22}e^{j2\pi\Delta f_2(Q+1)T} & \cdots & P_{2Q}e^{j2\pi\Delta f_2(2Q-1)T} \\ \vdots & & \cdots & \vdots \\ \vdots & & & \vdots \\ P_{M1}e^{j2\pi\Delta f_M QT} & P_{M2}e^{j2\pi\Delta f_M(Q+1)T} & \cdots & P_{MQ}e^{j2\pi\Delta f_M(2Q-1)T} \end{bmatrix} =$$

$$H \begin{bmatrix} e^{j2\pi\Delta f_1 QT} & & & \\ & e^{j2\pi\Delta f_2 QT} & & \\ & & \cdots & \\ & & & e^{j2\pi\Delta f_M QT} \end{bmatrix} P_{fix} = H * A_{phase} * P_{fix}$$

A pseudoinverse of the first information matrix (Formula 1-2) is left-multiplied to the second information matrix to obtain:

$$\begin{bmatrix} y_1^1 & y_1^2 & \cdots & y_1^Q \\ y_2^1 & y_2^2 & \cdots & y_2^Q \\ \vdots & \vdots & \cdots & \vdots \\ \vdots & \vdots & & \vdots \\ y_N^1 & y_N^2 & \cdots & y_N^Q \end{bmatrix}^{-1} \begin{bmatrix} y_1^{Q+1} & y_1^{Q+2} & \cdots & y_1^{2Q} \\ y_2^{Q+1} & y_2^{Q+2} & \cdots & y_2^{2Q} \\ \vdots & \vdots & \cdots & \vdots \\ \vdots & \vdots & & \vdots \\ y_N^{Q+1} & y_N^{Q+2} & \cdots & y_N^{2Q} \end{bmatrix} = \quad \text{(Formula 1-3)}$$

$$P_{fix}^{-1} * A_{phase} * P_{fix}$$

It can be learned from Formula 1-3 that a result obtained by left-multiplying the pseudoinverse of the first information matrix to the second information matrix has a standard eigenvalue decomposition property, and $A_{phase}$ is obtained through eigenvalue decomposition, to calculate eigenvalues: $e^{j2\pi\Delta f_1 QT}, e^{j2\pi\Delta f_2 QT}, \ldots,$ and $e^{j2\pi\Delta f_M QT}$. The frequency offset values between the M STAs and the AP calculated based on the foregoing eigenvalues are $\Delta f_1, \Delta f_2, \ldots,$ and $\Delta f_M$.

Case 2:

FIG. 7A shows the frames sent by the M STAs and received by the AP. The STA generates the second group of training sequences based on the matrix P1 in S610. Irrespective of the frequency offset between each of the M STAs and the AP, the first information matrix may be expressed as Formula 1-1.

However, in embodiments of this application, it is mainly considered that different frequency offsets exist between the STAs and the AP. For example, the frequency offsets between the M STAs and the AP are $\Delta f_1, \Delta f_2, \ldots,$ and $\Delta f_M$, due to a frequency offset, a phase of a training sequence sent by each of the M STAs on each symbol after the first symbol is an accumulated phase shift value relative to a phase of training sequence sent on the first symbol. Therefore, a phase shift angle of a training sequence sent on a symbol Q relative to the training sequence sent on the first symbol is $j2\pi\Delta f(Q-1)T$. In this case, the first information matrix is expressed as Formula 1-2.

The second group of training sequences is obtained by multiplying the preset training sequence by the matrix P1. Therefore, the second information matrix is expressed as:

$$\begin{bmatrix} y_1^{Q+1} & y_1^{Q+2} & \ldots & y_1^{2Q} \\ y_2^{Q+1} & y_2^{Q+2} & \ldots & y_2^{2Q} \\ \cdot & \cdot & & \cdot \\ \cdot & \cdot & \ldots & \cdot \\ \cdot & \cdot & & \cdot \\ y_N^{Q+1} & y_N^{Q+2} & \ldots & y_N^{2Q} \end{bmatrix} = \begin{bmatrix} h_{11} & h_{12} & \ldots & h_{1M} \\ h_{21} & h_{22} & \ldots & h_{2M} \\ \cdot & \cdot & & \cdot \\ \cdot & \cdot & \ldots & \cdot \\ \cdot & \cdot & & \cdot \\ h_{N1} & h_{N2} & \ldots & h_{NM} \end{bmatrix}$$

$$\begin{bmatrix} P_{11}e^{j(phaseshift1+2\pi\Delta f_1QT)} & P_{12}e^{j(phaseshift1+2\pi\Delta f_1(Q+1)T)} & \ldots & P_{1Q}e^{j(phaseshift1+2\pi\Delta f_1(2Q-1)T)} \\ P_{21}e^{j(phaseshift2+2\pi\Delta f_2QT)} & P_{22}e^{j(phaseshift2+2\pi\Delta f_2(Q+1)T)} & \ldots & P_{2Q}e^{j(phaseshift2+2\pi\Delta f_2(2Q-1)T)} \\ \cdot & & \cdot & \cdot \\ \cdot & & \ldots & \cdot \\ P_{M1}e^{j(phaseshiftM+2\pi\Delta f_MQT)} & P_{M2}e^{j(phaseshiftM+2\pi\Delta f_M3(Q+1)T)} & \ldots & P_{MQ}e^{j(phaseshiftM+2\pi\Delta f_M(2Q-1)T)} \end{bmatrix} =$$

$$H \begin{bmatrix} e^{j(phaseshift1+2\pi\Delta f_1QT)} & & & \\ & e^{j(phaseshift2+2\pi\Delta f_2QT)} & & \\ & & \ldots & \\ & & & e^{j(phaseshiftM+2\pi\Delta f_MQT)} \end{bmatrix} P_{fix} = H * A_{phase}^{shift} * P_{fix}.$$

A pseudoinverse of the first information matrix (Formula 1-2) is left-multiplied to second information matrix to obtain:

$$\begin{bmatrix} y_1^1 & y_1^2 & \ldots & y_1^Q \\ y_2^1 & y_2^2 & \ldots & y_2^Q \\ \cdot & \cdot & & \cdot \\ \cdot & \cdot & \ldots & \cdot \\ \cdot & \cdot & & \cdot \\ y_N^1 & y_N^2 & \ldots & y_N^Q \end{bmatrix}^{-1} \begin{bmatrix} y_1^{Q+1} & y_1^{Q+2} & \ldots & y_1^{2Q} \\ y_2^{Q+1} & y_2^{Q+2} & \ldots & y_2^{2Q} \\ \cdot & \cdot & & \cdot \\ \cdot & \cdot & \ldots & \cdot \\ \cdot & \cdot & & \cdot \\ y_N^{Q+1} & y_N^{Q+2} & \ldots & y_N^{2Q} \end{bmatrix} =$$  (Formula 1-7)

$$P_{fix}^{-1} * A_{phase}^{shift} * P_{fix}$$

It can be learned from Formula 1-7 that a result obtained by left-multiplying the pseudoinverse of the first information matrix to the second information matrix has a standard eigenvalue decomposition property, and $A_{phase}^{shift}$ is obtained through eigenvalue decomposition, to calculate eigenvalues: $e^{j(phaseshift1+2\pi\Delta f_1QT)}$, $e^{j(phaseshift2+2\pi\Delta f_2QT)}$, ..., and $e^{j(phaseshiftM+2\pi\Delta f_MQT)}$. The frequency offset values between the M STAs and the AP calculated based on the foregoing eigenvalues are $\Delta f_1$, $\Delta f_2$, ..., and $\Delta f_M$.

For Case 2, it should be noted that, during eigenvalue decomposition, eigenvalues may be calculated in descending order. As a result, STAs corresponding to the eigenvalues cannot be distinguished from each other. Therefore, an angle can be calculated for a calculated eigenvalue by adding a phase identification angle, to obtain an angle value corresponding to each eigenvalue. In uplink MU-MIMO, the latest 802.11ax protocol requires a STA to perform frequency offset pre-compensation within 350 Hz. That is, a frequency offset value between the STA and an AP does not exceed 350 Hz. A normal symbol is 16 μs. When two STAs communicate with the AP, a calculated angle value (irrespective of a phase identification angle) substantially satisfies $2\pi\Delta f_12T<4.032$ degrees, and a 90-degree phase identification angle may be added to the STA #1. In this way, an eigenvalue closest to 90 degrees is found from angle values for calculated eigenvalues as an eigenvalue corresponding to the STA #1. Similarly, $2\pi\Delta f_22T<4.032$ degrees is also applicable to the STA #2. If a 180-degree phase identification angle is added to the STA #2, an eigenvalue closest to 180 degrees is found from angle values for calculated eigenvalues as an eigenvalue corresponding to the STA #2. It should be understood that how to set the phase identification angle is not limited in this application. The phase identification angle may be set as required. In this way, phase shift angles of the STA #1 and the STA #2 can be simply obtained.

Case 3:

FIG. 7B shows the frames sent by the M STAs and received by the AP. Irrespective of a frequency offset between each of the M STAs and the AP, the first information matrix may be expressed as:

$$\begin{bmatrix} y_1^1 & y_1^3 & \ldots & y_1^{2Q-1} \\ y_2^1 & y_2^3 & \ldots & y_2^{2Q-1} \\ \cdot & \cdot & & \cdot \\ \cdot & \cdot & \ldots & \cdot \\ \cdot & \cdot & & \cdot \\ y_N^1 & y_N^3 & \ldots & y_N^{2Q-1} \end{bmatrix} =$$  (Formula 1-4)

$$\begin{bmatrix} h_{11} & h_{12} & \ldots & h_{1M} \\ h_{21} & h_{22} & \ldots & h_{2M} \\ \cdot & \cdot & & \cdot \\ \cdot & \cdot & \ldots & \cdot \\ \cdot & \cdot & & \cdot \\ h_{N1} & h_{N2} & \ldots & h_{NM} \end{bmatrix} \begin{bmatrix} P_{11} & P_{12} & \ldots & P_{1Q} \\ P_{21} & P_{22} & \ldots & 2Q \\ \cdot & \cdot & & \cdot \\ \cdot & \cdot & \ldots & \cdot \\ \cdot & \cdot & & \cdot \\ P_{M1} & P_{NM2} & \ldots & P_{MQ} \end{bmatrix}$$

However, in this application, it is mainly considered that different frequency offsets exist between the STAs and the AP. For example, the frequency offsets between the M STAs and the AP are $\Delta f_1$, $\Delta f_2$, ..., and $\Delta f_M$, and a phase shift difference between training sequences sent by each of the M STAs on symbols is two symbols due to a frequency offset and alternate arrangement. Therefore, a phase shift angle of a training sequence sent on a symbol Q relative to a training sequence sent on the first symbol is $j2\pi\Delta f(Q-1)2T$. In this case, the first information matrix is expressed as:

$$\begin{bmatrix} y_1^1 & y_1^3 & \cdots & y_1^{2Q-1} \\ y_2^1 & y_2^3 & \cdots & y_2^{2Q-1} \\ \vdots & \vdots & \cdots & \vdots \\ \vdots & \vdots & \cdots & \vdots \\ y_N^1 & y_N^3 & \cdots & y_N^{2Q-1} \end{bmatrix} = \begin{bmatrix} h_{11} & h_{12} & \cdots & h_{1M} \\ h_{21} & h_{22} & \cdots & h_{2M} \\ \vdots & \vdots & \cdots & \vdots \\ \vdots & \vdots & \cdots & \vdots \\ h_{N1} & h_{N2} & \cdots & h_{NM} \end{bmatrix} \quad \text{(Formula 1-5)}$$

$$\begin{bmatrix} P_{11} & P_{12}e^{j2\pi\Delta f_1 2T} & \cdots & P_{1Q}e^{j2\pi\Delta f_1(Q-1)2T} \\ P_{21} & P_{22}e^{j2\pi\Delta f_2 2T} & \cdots & P_{2Q}e^{j2\pi\Delta f_2(Q-1)2T} \\ \vdots & \vdots & & \vdots \\ \vdots & & \cdots & \vdots \\ P_{M1} & P_{M2}e^{j2\pi\Delta f_M 2T} & \cdots & P_{MQ}e^{j2\pi\Delta f_M(Q-1)2T} \end{bmatrix} =$$

$$H * P_{fix}^{cross}$$

Similarly, the second information matrix is expressed as:

$$\begin{bmatrix} y_1^2 & y_1^4 & \cdots & y_1^{2Q} \\ y_2^2 & y_2^4 & \cdots & y_2^{2Q} \\ \vdots & \vdots & \cdots & \vdots \\ \vdots & \vdots & \cdots & \vdots \\ y_N^2 & y_N^4 & \cdots & y_N^{2Q} \end{bmatrix} = \begin{bmatrix} h_{11} & h_{12} & \cdots & h_{1M} \\ h_{21} & h_{22} & \cdots & h_{2M} \\ \vdots & \vdots & \cdots & \vdots \\ \vdots & \vdots & \cdots & \vdots \\ h_{N1} & h_{N2} & \cdots & h_{NM} \end{bmatrix}$$

$$\begin{bmatrix} P_{11}e^{j2\pi\Delta f_1 T} & P_{12}e^{j2\pi\Delta f_1 3T} & \cdots & P_{1Q}e^{j2\pi\Delta f_1((Q-1)2T+T)} \\ P_{21}e^{j2\pi\Delta f_2 2T} & P_{22}e^{j2\pi\Delta f_2 3T} & \cdots & P_{2Q}e^{j2\pi\Delta f_2((Q-1)2T+T)} \\ \vdots & \vdots & & \vdots \\ \vdots & & \cdots & \vdots \\ P_{M1}e^{j2\pi\Delta f_M T} & P_{M2}e^{j2\pi\Delta f_M 3T} & \cdots & P_{MQ}e^{j2\pi\Delta f_M((Q-1)2T+T)} \end{bmatrix} =$$

$$H \begin{bmatrix} e^{j2\pi\Delta f_1 T} & & & \\ & e^{j2\pi\Delta f_2 T} & & \\ & & \cdots & \\ & & & e^{j2\pi\Delta f_M T} \end{bmatrix} P_{fix}^{cross} = H * A_{phase}^{cross} * P_{fix}^{cross}$$

A pseudoinverse of the first information matrix (Formula 1-5) is left-multiplied to the second information matrix to obtain:

$$\begin{bmatrix} y_1^1 & y_1^3 & \cdots & y_1^{2Q-1} \\ y_2^1 & y_2^3 & \cdots & y_2^{2Q-1} \\ \vdots & \vdots & \cdots & \vdots \\ \vdots & \vdots & \cdots & \vdots \\ y_N^1 & y_N^3 & \cdots & y_N^{2Q-1} \end{bmatrix} \begin{bmatrix} y_1^2 & y_1^4 & \cdots & y_1^{2Q} \\ y_2^2 & y_2^4 & \cdots & y_2^{2Q} \\ \vdots & \vdots & \cdots & \vdots \\ \vdots & \vdots & \cdots & \vdots \\ y_N^2 & y_N^4 & \cdots & y_N^{2Q} \end{bmatrix} = \quad \text{(Formula 1-6)}$$

$$P_{fix}^{cross-1} * A_{phase}^{cross} * P_{fix}^{cross}$$

It can be learned from Formula 1-6 that a result obtained by left-multiplying the pseudoinverse of the first information matrix to the second information matrix has a standard eigenvalue decomposition property, and $A_{phase}^{cross}$ is obtained through eigenvalue decomposition, to calculate eigenvalues: $e^{j2\pi\Delta f_1 T}$, $e^{j2\pi\Delta f_2 T}$, ..., and $e^{j2\pi\Delta f_M T}$. The frequency offset values between the M STAs and the AP calculated based on the foregoing eigenvalues are $\Delta f_1$, $\Delta f_2$, ..., and $\Delta f_M$.

When FIG. 7C shows the frames sent by the M STAs and received by the AP, eigenvalues can be calculated: $e^{j2\pi\Delta f_1 2T}$, $e^{j2\pi\Delta f_2 2T}$, ..., and $e^{j2\pi\Delta f_M 2T}$. The frequency offset values between the M STAs and the AP calculated based on the eigenvalues are $\Delta f_1$, $\Delta f_2$, ..., and $\Delta f_M$. When N first locations and N second locations are alternately arranged (N is less than Q), eigenvalues can be calculated: $e^{j2\pi\Delta f_1 NT}$, $e^{j2\pi\Delta f_2 NT}$, ..., and $e^{j2\pi\Delta f_M NT}$. The frequency offset values between the M STAs and the AP calculated based on the eigenvalues are $\Delta f_1$, $\Delta f_2$, ..., and $\Delta f_M$. A specific calculation process is similar to that shown in Case 3, and details are not described herein again.

For Case 3, it should be noted that, if there are more STAs, a maximum angle value of $2\pi\Delta f_1 QT$ satisfies $2\pi\Delta f_1 QT \leq 2.016Q$ degrees. As a result, frequency offset values for the STAs cannot be distinguished from each other even if phase identification information is added as described in Case 2. An MU-MIMO system including an eight-antenna AP and eight-single-antenna STAs is used as an example. When there are eight STAs, Q is 8 according to Mapping Table 2, an angle for an eigenvalue that can be obtained by the AP satisfies $2\pi\Delta f_1 8T \leq 16.265$ degrees. When a range available for the phase identification information is 360 degrees, a mean range for the eight STAs satisfies 360/8=45 degrees. If it is expected that an eigenvalue for a STA is not incorrectly determined, an angle for an eigenvalue needs to be less than 45/2=22.5 degrees. In this way, an angle for an eigenvalue of a specific STA can be figured out without error. Currently, a maximum angle for the eigenvalues of the eight STAs can reach 16 degrees, which is close to 22.5 degrees. When there are more STAs or a loud system noise causes an error in eigenvalue calculation, angles for the STAs may be incorrectly determined, which may cause specific risks. Currently, the latest 802.11ax supports only a maximum of eight STAs, which can ensure performance to a certain extent. However, to ensure extensibility, this embodiment provides a mode of arranging training sequence groups alternately, that is, the arrangement mode in FIG. 8B. In this case, the angle values for the eigenvalues are irrelevant to a quantity of STAs. Because the eigenvalues are always $e^{j2\pi\Delta f_1 T}$, $e^{j2\pi\Delta f_2 T}$, ..., and $e^{j2\pi\Delta f_M T}$, the angle for the eigenvalue satisfies $2\pi\Delta f_1 T \leq 2.016$ degrees, and is far less than 360/M degrees. This reduces a misjudgment possibility.

Case 4:

FIG. 7B shows the data frames sent by the M STAs and received by the AP. The STA generates the second group of training sequences based on the matrix P1 in S610. Irrespective of the frequency offset between each of the M STAs and the AP, the first information matrix may be expressed as Formula 1-4.

However, in this application, it is mainly considered that different frequency offsets exist between the STAs and the AP. For example, the frequency offsets between the M STAs and the AP are $\Delta f_1$, $\Delta f_2$, ..., and $\Delta f_M$, and a phase shift difference between training sequences sent by each of the M STAs on symbols is two symbols due to a frequency offset and alternate arrangement. Therefore, a phase shift angle of a training sequence sent on a symbol Q relative to a training sequence sent on the first symbol is $j2\pi\Delta f(Q-1)2T$. In this case, the first information matrix is expressed as Formula 1-5.

The second group of training sequences is obtained by multiplying the preset training sequence by the matrix P1. Therefore, the second information matrix is expressed as:

$$\begin{bmatrix} y_1^2 & y_1^4 & \cdots & y_1^{2Q} \\ y_2^2 & y_2^4 & \cdots & y_2^{2Q} \\ \cdot & \cdot & & \cdot \\ \cdot & \cdot & \cdots & \cdot \\ \cdot & \cdot & & \cdot \\ y_N^2 & y_N^4 & \cdots & y_N^{2Q} \end{bmatrix} = \begin{bmatrix} h_{11} & h_{12} & \cdots & h_{1M} \\ h_{21} & h_{22} & \cdots & h_{2M} \\ \cdot & \cdot & & \cdot \\ \cdot & \cdot & \cdots & \cdot \\ \cdot & \cdot & & \cdot \\ h_{N1} & h_{N2} & \cdots & h_{NM} \end{bmatrix}$$

$$\begin{bmatrix} P_{11}e^{j(phaseshift1+2\pi\Delta f_1 T)} & P_{12}e^{j(phaseshift1+2\pi\Delta f_1 3T)} & \cdots & P_{1Q}e^{j(phaseshift1+2\pi\Delta f_1 ((Q-1)2T+T))} \\ P_{21}e^{(phaseshift2+2\pi\Delta f_2 T)} & P_{22}e^{j(phaseshift2+2\pi\Delta f_2 3T)} & \cdots & P_{2Q}e^{j(phaseshift2+2\pi\Delta f_2((Q-1)2T+T))} \\ \cdot & \cdot & & \cdot \\ \cdot & \cdot & \cdots & \cdot \\ \cdot & \cdot & & \cdot \\ P_{M1}e^{j(phaseshiftM+2\pi\Delta f_M T)} & P_{M2}e^{j(phaseshiftM+2\pi\Delta f_M 3T)} & \cdots & P_{MQ}e^{j(phaseshiftM+2\pi\Delta f_M((Q-1)2T+T))} \end{bmatrix} =$$

$$H \begin{bmatrix} e^{j(phaseshift1+2\pi\Delta f_1 T)} & & & \\ & e^{j(phaseshift2+2\pi\Delta f_2 T)} & & \\ & & \cdots & \\ & & & e^{j(phaseshiftM+2\pi\Delta f_M T)} \end{bmatrix} \quad P_{fix}^{cross} = H * A_{phase}^{cross,shift} * P_{fix}^{cross}$$

A pseudoinverse of the first information matrix (Formula 1-5) is left-multiplied to the second information matrix to obtain:

$$\varphi$$

It can be learned from Formula 1-8 that a result obtained by left-multiplying the pseudoinverse of the first information matrix to the second information matrix has a standard eigenvalue decomposition property, and $A_{phase}^{cross,shift}$ is obtained through eigenvalue decomposition, to calculate eigenvalues: $e^{j(phaseshift1+2\pi\Delta f_1 T)}$, $e^{j(phaseshift2+2\pi\Delta f_2 T)}$, ..., and $e^{j(phaseshiftM+2\pi\Delta f_M T)}$. The frequency offset values between the M STAs and the AP calculated based on the foregoing eigenvalues are $\Delta f_1, \Delta f_2, \ldots$, and $\Delta f_M$.

Compared with channel estimation shown in FIG. 4 and FIG. 5, the uplink multi-station channel estimation method provided in this application can calculate a more accurate frequency offset value, and can improve channel estimation accuracy when performing channel estimation based on the calculated frequency offset value.

Further, after calculating the frequency offset values between the M STAs and the AP, the AP can correct the matrix P shown above based on the frequency offset values, to obtain a corrected matrix P.

The method procedure shown in FIG. 6 further includes S640: The AP performs channel estimation based on the corrected matrix, which includes the following three cases:

Case 1:
The AP right-multiplies a pseudoinverse of the corrected matrix P to the first information matrix to obtain a channel information matrix, so as to complete channel estimation.

Case 2:
The AP right-multiplies, to the second information matrix, a pseudoinverse of a matrix obtained by left-multiplying the corrected matrix P by the matrix $A_{phase}$, to obtain a channel information matrix and complete channel estimation;

the AP right-multiplies, to the second information matrix, a pseudoinverse of a matrix obtained by left-multiplying the corrected matrix P by the matrix $A_{phase}^{shift}$, to obtain a channel information matrix and complete channel estimation;

the AP right-multiplies, to the second information matrix, a pseudoinverse of a matrix obtained by left-multiplying the corrected matrix P by the matrix $A_{phase}^{cross}$, to obtain a channel information matrix and complete channel estimation; or the AP right-multiplies, to the second information matrix, a pseudoinverse of a matrix obtained by left-multiplying the corrected matrix P by the matrix $A_{phase}^{cross,shift}$, to obtain a channel information matrix and complete channel estimation.

Case 3:
The AP right-multiplies a pseudoinverse of the corrected matrix P to the first information matrix, to obtain the first channel information; and the AP right-multiplies, to the second information matrix, a pseudoinverse of a matrix that is obtained by left-multiplying the corrected matrix P by the matrix $A_{phase}$, $A_{phase}^{shift}$, $A_{phase}^{cross}$, or $A_{phase}^{cross,shift}$, to obtain second channel information; and calculates a weighted mean of the first channel information and the second channel information, to obtain a channel information matrix and complete channel estimation. The calculating a weighted mean of the first channel information and the second channel information may be understood as calculating an arithmetic mean, a geometric mean, or the like of the first channel information and the second channel information.

It should be understood that a specific manner of calculating the mean of the first channel information and the second channel information is not limited in embodiments of this application. It should be further understood that, when the mean of the first channel information and the second channel information is used as a to-be-calculated channel information matrix, precision can be improved by 3 dB. For example, a signal-to-noise ratio is increased by 3 dB, a transmit power is increased by 3 dB, or channel estimation accuracy is improved by 3 dB.

To facilitate understanding of a procedure in which the AP completes channel estimation, the following provides description by using an example in which two STAs communicate with the AP. The AP includes an antenna #1 and an antenna #2, and a STA #1 and a STA #2 are single-antenna STAs. In addition, frequency offset values between the AP and the STA #1 and the STA #2 are $\Delta f_1$ and $\Delta f_2$, and a matrix P is $$\begin{bmatrix} 1 & -1 \\ 1 & 1 \end{bmatrix}.$$

Corresponding to the four cases shown in S630, the AP estimates channel information of the two STAs in the following four cases:

Case 1:

FIG. 8A shows forms of frames sent by a STA #1 and a STA #2 and received by the AP. Data received by an antenna #1 of the AP is a sum of two parts of data: data from the STA #1 through a channel $h_{11}$ and data from the STA #2 through a channel $h_{12}$. Data received by an antenna #2 of the AP is a sum of two parts of data: data from the STA #1 through a channel $h_{21}$ and data from the STA #2 through a channel $h_{22}$. For each training sequence symbol, because there are different frequency offsets for the STAs relative to the AP, data sent by the STA #1 on the second symbol should be −1. However, due to phase shift, data becomes $-1e^{j2\pi\Delta f_1 T}$. Similarly, data sent by the STA #2 on the second symbol should be 1. However, due to phase shift, data becomes $1e^{j2\pi\Delta f_2 T}$. In this case, the first information matrix received by the AP is:

$$\begin{bmatrix} y_1^1 & y_1^2 \\ y_2^1 & y_2^2 \end{bmatrix} = \begin{bmatrix} h_{11} & h_{12} \\ h_{21} & h_{22} \end{bmatrix} \begin{bmatrix} 1 & -1e^{j2\pi\Delta f_1 T} \\ 1 & 1e^{j2\pi\Delta f_2 T} \end{bmatrix} \quad \text{(Formula 2-1)}$$

The second information matrix received by the AP is:

$$\begin{bmatrix} y_1^3 & y_1^4 \\ y_2^3 & y_2^4 \end{bmatrix} = \begin{bmatrix} h_{11} & h_{12} \\ h_{21} & h_{22} \end{bmatrix} \begin{bmatrix} 1e^{j2\pi\Delta f_1 2T} & -1e^{j2\pi\Delta f_1 3T} \\ 1e^{j2\pi\Delta f_2 2T} & 1e^{j2\pi\Delta f_2 3T} \end{bmatrix} = \quad \text{(Formula 2-2)}$$

$$\begin{bmatrix} h_{11} & h_{12} \\ h_{21} & h_{22} \end{bmatrix} \begin{bmatrix} e^{j2\pi\Delta f_1 2T} & 0 \\ 0 & e^{j2\pi\Delta f_2 2T} \end{bmatrix} \begin{bmatrix} 1 & -1e^{j2\pi\Delta f_1 T} \\ 1 & 1e^{j2\pi\Delta f_2 T} \end{bmatrix}$$

The AP left-multiplies a pseudoinverse of the first information matrix to the second information matrix to obtain a corresponding eigenvalue standard form:

$$\begin{bmatrix} y_1^1 & y_1^2 \\ y_2^1 & y_2^2 \end{bmatrix}^{-1} \begin{bmatrix} y_1^3 & y_1^4 \\ y_2^3 & y_2^4 \end{bmatrix} = \quad \text{(Formula 2-3)}$$

$$\begin{bmatrix} 1 & -1e^{j2\pi\Delta f_1 T} \\ 1 & 1e^{j2\pi\Delta f_2 T} \end{bmatrix}^{-1} \begin{bmatrix} e^{j2\pi\Delta f_1 T} & 0 \\ 0 & e^{j2\pi\Delta f_2 T} \end{bmatrix} \begin{bmatrix} 1 & -1e^{j2\pi\Delta f_1 T} \\ 1 & 1e^{j2\pi\Delta f_2 T} \end{bmatrix}$$

Eigenvalues $e^{j2\pi\Delta f_1 T}$ and $e^{j2\pi\Delta f_2 T}$ can be obtained according to an eigenvalue decomposition theorem, angles for the eigenvalues are calculated, and then the angles are divided by corresponding coefficients to obtain $\Delta f_1$ and $\Delta f_2$.

It may be obtained based on $\Delta f_1$ and $\Delta f_2$ that a corrected matrix $P P_{fix}$ is $$\begin{bmatrix} 1 & -1e^{j2\pi\Delta f_1 T} \\ 1 & 1e^{j2\pi\Delta f_2 T} \end{bmatrix}.$$

Performing channel estimation based on $P_{fix}$ includes:

right-multiplying a pseudoinverse of $P_{fix}$ to the first information matrix (Formula 2-1) to obtain $$\begin{bmatrix} h_{11} & h_{12} \\ h_{21} & h_{22} \end{bmatrix};$$

right-multiplying, to the second information matrix (Formula 2-2), a pseudoinverse of a matrix that is obtained by left-multiplying $P_{fix}$ by an eigenvalue matrix $$\begin{bmatrix} e^{j2\pi\Delta f_1 2T} & 0 \\ 0 & e^{j2\pi\Delta f_2 2T} \end{bmatrix}$$

in Formula 2-2 to obtain $$\begin{bmatrix} h_{11} & h_{12} \\ h_{21} & h_{22} \end{bmatrix};$$

or right-multiplying a pseudoinverse of $P_{fix}$ to the first information matrix (Formula 2-1) to obtain $$\begin{bmatrix} h_{11} & h_{12} \\ h_{21} & h_{22} \end{bmatrix} \#1,$$

and right-multiplying, to the second information matrix (Formula 2-2), a pseudoinverse of a matrix that is obtained by left-multiplying $P_{fix}$ by an eigenvalue matrix $$\begin{bmatrix} e^{j2\pi\Delta f_1 2T} & 0 \\ 0 & e^{j2\pi\Delta f_2 2T} \end{bmatrix}$$

in Formula 2-2, to obtain $$\begin{bmatrix} h_{11} & h_{12} \\ h_{21} & h_{22} \end{bmatrix} \#2.$$

A mean of $$\begin{bmatrix} h_{11} & h_{12} \\ h_{21} & h_{22} \end{bmatrix} \#1 \text{ and } \begin{bmatrix} h_{11} & h_{12} \\ h_{21} & h_{22} \end{bmatrix} \#2$$

is calculated as $$\begin{bmatrix} h_{11} & h_{12} \\ h_{21} & h_{22} \end{bmatrix},$$

and channel estimation is affected by noise. Therefore, a mean of two channel estimation results can improve accuracy by 3 dB, which may be understood as: A transmit power or a signal-to-noise ratio is increased by 3 dB, or channel estimation accuracy is improved by 3 dB $$\begin{bmatrix} h_{11} & h_{12} \\ h_{21} & h_{22} \end{bmatrix} \#1 \text{ and } \begin{bmatrix} h_{11} & h_{12} \\ h_{21} & h_{22} \end{bmatrix} \#2$$

should be accurate channel information matrices irrespective of noise.

Case 2:

FIG. 8A shows forms of frames sent by a STA #1 and a STA #2 and received by the AP. Each of the STA #1 and the STA #2 generates a second group of training sequences in their respective training sequences based on a matrix P1. The matrix P1 is $$\begin{bmatrix} e^{jphaseshift1} & 0 \\ 0 & e^{jphaseshift2} \end{bmatrix} \begin{bmatrix} 1 & -1 \\ 1 & 1 \end{bmatrix}, \text{ where } \begin{bmatrix} e^{jphaseshift1} & 0 \\ 0 & e^{jphaseshift2} \end{bmatrix}$$

is referred to as a phase identification matrix.

In this case, the first information matrix received by the AP is:

$$\begin{bmatrix} y_1^1 & y_1^3 \\ y_2^1 & y_2^3 \end{bmatrix} = \begin{bmatrix} h_{11} & h_{12} \\ h_{21} & h_{22} \end{bmatrix} \begin{bmatrix} 1 & -1e^{j2\pi\Delta f_1 2T} \\ 1 & 1e^{j2\pi\Delta f_2 2T} \end{bmatrix} \quad \text{(Formula 2-7)}$$

The second information matrix received by the AP is:

$$\begin{bmatrix} y_1^3 & y_1^4 \\ y_2^3 & y_2^4 \end{bmatrix} = \begin{bmatrix} h_{11} & h_{12} \\ h_{21} & h_{22} \end{bmatrix} \begin{bmatrix} e^{jphaseshift1} & 0 \\ 0 & e^{jphaseshift2} \end{bmatrix} \quad \text{(Formula 2-8)}$$
$$\begin{bmatrix} e^{j2\pi\Delta f_1 2T} & 0 \\ 0 & e^{j2\pi\Delta f_2 2T} \end{bmatrix} \begin{bmatrix} 1 & -1e^{j2\pi\Delta f_1 T} \\ 1 & 1e^{j2\pi\Delta f_2 T} \end{bmatrix}$$

The AP left-multiplies a pseudoinverse of the first information matrix to the second information matrix to obtain a corresponding eigenvalue standard form:

$$\begin{bmatrix} y_1^1 & y_1^2 \\ y_2^1 & y_2^2 \end{bmatrix}^{-1} \begin{bmatrix} y_1^3 & y_1^4 \\ y_2^3 & y_2^4 \end{bmatrix} = \begin{bmatrix} 1 & -1e^{j2\pi\Delta f_1 T} \\ 1 & 1e^{j2\pi\Delta f_2 T} \end{bmatrix}^{-1}$$
$$\begin{bmatrix} e^{j(phaseshift1+2\pi\Delta f_1 2T)} & 0 \\ 0 & e^{j(phaseshift2+2\pi\Delta f_2 2T)} \end{bmatrix} \begin{bmatrix} 1 & -1e^{j2\pi\Delta f_1 T} \\ 1 & 1e^{j2\pi\Delta f_2 T} \end{bmatrix}$$

Eigenvalues $e^{j(phaseshift1+2\pi\Delta f_1 2T)}$ and $e^{j(phaseshift2+2\pi\Delta f_2 2T)}$ can be obtained according to an eigenvalue decomposition theorem, angles phaseshift1+$2\pi\Delta f_1 2T$ and phaseshift2+$2\pi\Delta f_2 2T$ for the eigenvalues are calculated, and then the angles are divided by coefficients to obtain $\Delta f_1$ and $\Delta f_2$.

A corrected matrix P $P_{fix}$ may be obtained based on $\Delta f_1$ and $\Delta f_2$, and channel estimation based on $P_{fix}$ is similar to that described in Case 1. Details are not described herein again.

Case 3:

FIG. 8B shows the frames sent by the M STAs and received by the AP.

In this case, the first information matrix received by the AP is:

$$\begin{bmatrix} y_1^1 & y_1^3 \\ y_2^1 & y_2^3 \end{bmatrix} = \begin{bmatrix} h_{11} & h_{12} \\ h_{21} & h_{22} \end{bmatrix} \begin{bmatrix} 1 & -1e^{j2\pi\Delta f_1 2T} \\ 1 & 1e^{j2\pi\Delta f_2 2T} \end{bmatrix} \quad \text{(Formula 2-4)}$$

The second information matrix received by the AP is:

$$\begin{bmatrix} y_1^1 & y_1^3 \\ y_2^1 & y_2^3 \end{bmatrix} = \begin{bmatrix} h_{11} & h_{12} \\ h_{21} & h_{22} \end{bmatrix} \begin{bmatrix} 1 & -1e^{j2\pi\Delta f_1 2T} \\ 1 & 1e^{j2\pi\Delta f_2 2T} \end{bmatrix} = \begin{bmatrix} \quad \text{(Formula 2-5)}$$
$$\begin{bmatrix} h_{11} & h_{12} \\ h_{21} & h_{22} \end{bmatrix} \begin{bmatrix} e^{j2\pi\Delta f_1 2T} & 0 \\ 0 & e^{j2\pi\Delta f_1 2T} \end{bmatrix} \begin{bmatrix} 1 & -1e^{j2\pi\Delta f_1 2T} \\ 1 & 1e^{j2\pi\Delta f_1 2T} \end{bmatrix}$$

The AP left-multiplies a pseudoinverse of the first information matrix to the second information matrix to obtain a corresponding eigenvalue standard form:

$$\begin{bmatrix} y_1^1 & y_1^3 \\ y_2^1 & y_2^3 \end{bmatrix}^{-1} \begin{bmatrix} y_1^2 & y_1^4 \\ y_2^2 & y_2^4 \end{bmatrix} = \begin{bmatrix} 1 & -1e^{j2\pi\Delta f_1 2T} \\ 1 & 1e^{j2\pi\Delta f_1 2T} \end{bmatrix} \quad \text{(Formula 2-6)}$$
$$\begin{bmatrix} e^{j2\pi\Delta f_1 2T} & 0 \\ 0 & e^{j2\pi\Delta f_1 2T} \end{bmatrix} \begin{bmatrix} 1 & -1e^{j2\pi\Delta f_1 2T} \\ 1 & 1e^{j2\pi\Delta f_1 2T} \end{bmatrix}$$

Eigenvalues $e^{j2\pi\Delta f_1 T}$ and $e^{j2\pi\Delta f_2 T}$ can be obtained according to an eigenvalue decomposition theorem, angles for the eigenvalues are calculated, and then the angles are divided by corresponding coefficients to obtain $\Delta f_1$ and $\Delta f_2$.

A corrected matrix P $P_{fix}$ may be obtained based on $\Delta f_1$ and $\Delta f_2$, and channel estimation based on $P_{fix}$ is similar to that described in Case 1. Details are not described herein again.

Case 4:

FIG. 8B shows forms of frames sent by a STA #1 and a STA #2 and received by the AP. Each of the STA #1 and the STA #2 generates a second group of training sequences in their respective training sequences based on a matrix P1.

In this case, the first information matrix received by the AP is:

$$\begin{bmatrix} y_1^1 & y_1^3 \\ y_2^1 & y_2^3 \end{bmatrix} = \begin{bmatrix} h_{11} & h_{12} \\ h_{21} & h_{22} \end{bmatrix} \begin{bmatrix} 1 & -1e^{j2\pi\Delta f_1 2T} \\ 1 & 1e^{j2\pi\Delta f_2 2T} \end{bmatrix}$$

The second information matrix received by the AP is:

$$\begin{bmatrix} y_1^2 & y_1^4 \\ y_2^2 & y_2^4 \end{bmatrix} = \begin{bmatrix} h_{11} & h_{12} \\ h_{21} & h_{22} \end{bmatrix}$$
$$\begin{bmatrix} e^{jphaseshift1} & 0 \\ 0 & e^{jphaseshift2} \end{bmatrix} \begin{bmatrix} e^{j2\pi\Delta f_1 T} & 0 \\ 0 & e^{j2\pi\Delta f_2 T} \end{bmatrix} \begin{bmatrix} 1 & -1e^{j2\pi\Delta f_1 2T} \\ 1 & 1e^{j2\pi\Delta f_2 2T} \end{bmatrix}$$

The AP left-multiplies a pseudoinverse of the first information matrix to the second information matrix to obtain a corresponding eigenvalue standard form:

$$\begin{bmatrix} y_1^1 & y_1^3 \\ y_2^1 & y_2^3 \end{bmatrix}^{-1} \begin{bmatrix} y_1^2 & y_1^4 \\ y_2^2 & y_2^4 \end{bmatrix} = \begin{bmatrix} 1 & -1e^{j2\pi\Delta f_1 2T} \\ 1 & 1e^{j2\pi\Delta f_2 2T} \end{bmatrix}^{-1}$$
$$\begin{bmatrix} e^{j(phaseshift1+2\pi\Delta f_1 T)} & 0 \\ 0 & e^{j(phaseshift2+2\pi\Delta f_2 T)} \end{bmatrix} \begin{bmatrix} 1 & -1e^{j2\pi\Delta f_1 2T} \\ 1 & 1e^{j2\pi\Delta f_2 2T} \end{bmatrix}.$$

Eigenvalues $e^{j(phaseshift1+2\pi\Delta f_1 T)}$ and $e^{j(phaseshift2+2\pi\Delta f_2 T)}$ can be obtained according to an eigenvalue decomposition theorem, angles phaseshift1+$2\pi\Delta f_1 T$ and phaseshift2+$2\pi\Delta f_2 T$ for the eigenvalues are calculated, and then the angles are divided by coefficients to obtain $\Delta f_1$ and $\Delta f_2$.

A corrected matrix P $P_{fix}$ may be obtained based on $\Delta f_1$ and $\Delta f_2$, and channel estimation based on $P_{fix}$ is similar to that described in Case 1. Details are not described herein again.

It should be understood that Case 1 to Case 4 are all described by using an example in which the frame sent by the STA includes two groups of training sequences. However, it is not limited in embodiments of this application that the frame sent by the STA includes only two groups of training sequences. For example, the frame may further include four groups of training sequences. In this case, in a process of calculating a frequency offset value, the four groups of training sequences are divided into two groups of training sequences, and frequency offset values are respectively calculated based on the two groups of training sequences. Then, a mean of the two groups of calculated frequency offset values is calculated, and the mean is used as the calculated frequency offset value. A specific procedure is not described herein again.

The uplink multi-station channel estimation method provided in this embodiment of this application can more accurately estimate the channel information matrix. The channel information matrix may be used in the following two cases:

Case 1:

A STA sends a data load through uplink MU-MIMO. An AP side left-multiplies a pseudoinverse of a channel information matrix to a data matrix, so that data can be accurately orthogonally equalized, and data of all STAs can be distinguished from each other.

Description is provided by using an example in which two STAs communicate with an AP.

When a data frame shown in FIG. 8A or FIG. 8B includes a data payload, that is, data $$\begin{bmatrix} \text{data1} \\ \text{data2} \end{bmatrix}$$

is carried on a symbol following a training sequence, a data payload matrix received on an AP side is expressed as follows:

$$\begin{bmatrix} y_{date1} \\ y_{date2} \end{bmatrix} = \begin{bmatrix} h_{11} & h_{12} \\ h_{21} & h_{22} \end{bmatrix} \begin{bmatrix} \text{data1} \\ \text{data2} \end{bmatrix}$$

Because the channel information matrix has been obtained through estimation by using the training sequence before the data load in the data frame, the data from all the STAs that is distinguished from each other by the AP side is:

$$\begin{bmatrix} h_{11} & h_{12} \\ h_{21} & h_{22} \end{bmatrix}^{-1} \begin{bmatrix} y_{date1} \\ y_{date2} \end{bmatrix} = \begin{bmatrix} h_{11} & h_{12} \\ h_{21} & h_{22} \end{bmatrix}^{-1} \begin{bmatrix} h_{11} & h_{12} \\ h_{21} & h_{22} \end{bmatrix} \begin{bmatrix} \text{data1} \\ \text{data2} \end{bmatrix} = \begin{bmatrix} \text{data1} \\ \text{data2} \end{bmatrix}$$

Case 2:

An AP precodes downlink MU-MIMO data by using a channel, that is, a pseudoinverse of the channel is left-multiplied to the sent data, which is equivalent to pre-equalization on the AP side. In this case, data received by a plurality of STAs does not crosstalk with each other.

Description is provided by using an example in which two STAs communicate with an AP.

The data sent by the AP may be expressed as:

$$\begin{bmatrix} s_{date1} \\ s_{date2} \end{bmatrix} = \begin{bmatrix} h_{11} & h_{12} \\ h_{21} & h_{22} \end{bmatrix}^{-1} \begin{bmatrix} \text{data1} \\ \text{data2} \end{bmatrix}$$

The data received on the STA side is:

$$\begin{bmatrix} h_{11} & h_{12} \\ h_{21} & h_{22} \end{bmatrix} \begin{bmatrix} s_{date1} \\ s_{date2} \end{bmatrix} = \begin{bmatrix} h_{11} & h_{12} \\ h_{21} & h_{22} \end{bmatrix} \begin{bmatrix} h_{11} & h_{12} \\ h_{21} & h_{22} \end{bmatrix}^{-1} \begin{bmatrix} \text{data1} \\ \text{data2} \end{bmatrix} = \begin{bmatrix} \text{data1} \\ \text{data2} \end{bmatrix}$$

It should be further understood that sequence numbers of the foregoing processes do not mean execution sequences in the foregoing method embodiments. The execution sequences of the processes should be determined based on functions and internal logic of the processes, and should not be construed as any limitation on the implementation processes of embodiments of this application.

The foregoing describes in detail the uplink multi-station channel estimation method provided in embodiments of this application with reference to FIG. 6. The following describes in detail an uplink multi-station channel estimation apparatus provided in embodiments of this application with reference to FIG. 9 to FIG. 12.

Figure 9:
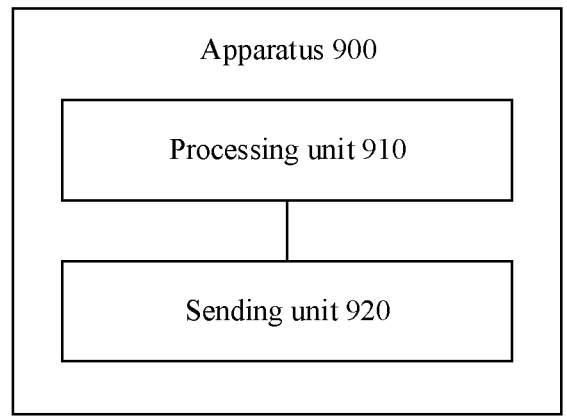
FIG. 9 is a diagram of an uplink multi-station channel estimation apparatus according to this application.

Refer to FIG. 9. FIG. 9 is a diagram of an uplink multi-station channel estimation apparatus 900 according to this application. As shown in FIG. 9, the apparatus 900 includes a processing unit 910 and a sending unit 920.

The processing unit 910 is configured to generate a frame. The frame includes a first group of training sequences and a second group of training sequences, the first group of training sequences and the second group of training sequences are used for calculating a frequency offset value between a STA and an access point AP, and the frequency offset value is used for channel estimation.

The sending unit 920 is configured to send the frame to the AP.

The apparatus 900 completely corresponds to the STA in the method embodiments. The apparatus 900 may be the STA in the method embodiments, or a chip or a functional module inside the STA in the method embodiments. Corresponding units of the apparatus 900 are configured to perform corresponding steps performed by the STA in the method embodiment shown in FIG. 6.

The processing unit 910 of the apparatus 900 performs steps implemented or processed internally by the STA in the method embodiments, for example, step S610 of generating a frame in FIG. 6.

The sending unit 920 performs the sending step performed by the STA in the method embodiments, for example, step S620 of sending the frame to the AP in FIG. 6.

The apparatus 900 may further include a receiving unit, configured to perform the receiving step performed by the STA, for example, receiving information sent by another device. The sending unit 920 and the receiving unit may form a transceiver unit, which has both a receiving function and a sending function. The processing unit 910 may be a processor. The sending unit 920 may be a transmitter, and the receiving unit may be a receiver. The receiver and the transmitter may be integrated together to form a transceiver.

Figure 10:
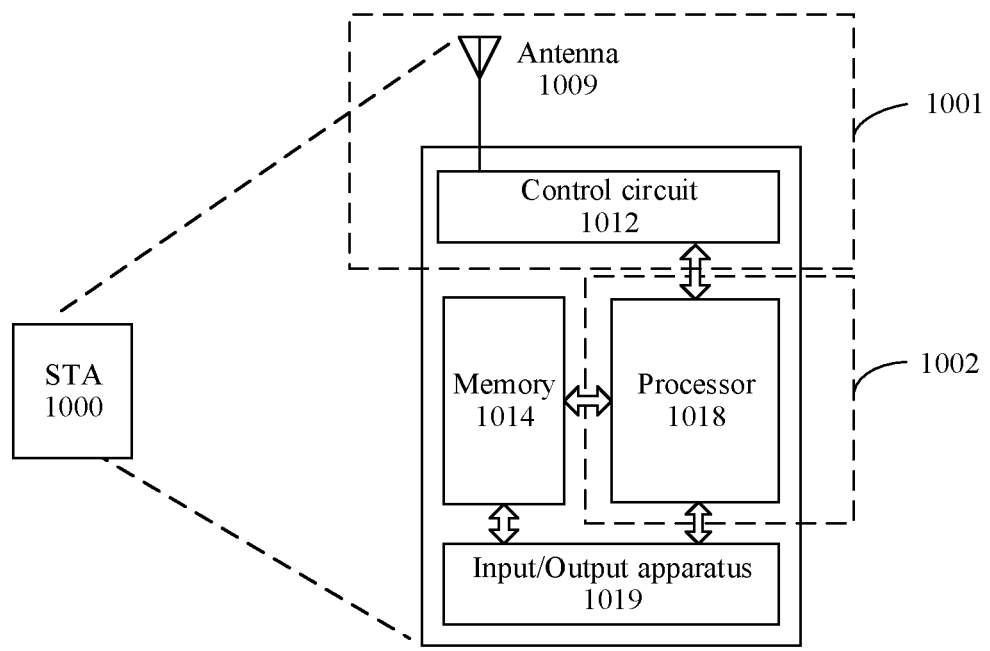
FIG. 10 is a diagram of a STA applicable to an embodiment of this application.

Refer to FIG. 10. FIG. 10 is a diagram of a STA 1000 according to an embodiment of this application. The STA 1000 may be applied to the system shown in FIG. 1. For ease of description, FIG. 10 shows only main components of the STA 1000. As shown in FIG. 10, the STA 1000 includes a processor 1018 (corresponding to the processing unit 910 shown in FIG. 9), a memory 1014, a control circuit 1012, an antenna 1009, and an input/output apparatus 1019 (corresponding to the sending unit 920 shown in FIG. 9). The processor 1018 is configured to control the antenna 1009 and the input/output apparatus 1019 to send and receive a signal, the memory 1014 is configured to store a computer program, and the processor 1018 is configured to invoke and run the computer program from the memory 1014, to perform a corresponding procedure and/or operation performed by the STA 1000 in the uplink multi-station channel estimation method provided in this application. Details are not described herein again.

A person skilled in the art may understand that, for ease of description, FIG. 10 shows only one memory and one processor. Actually, the STA may include a plurality of processors and a plurality of memories. The memory may also be referred to as a storage medium, a storage device, or the like. This is not limited in embodiments of this application.

Figure 11:
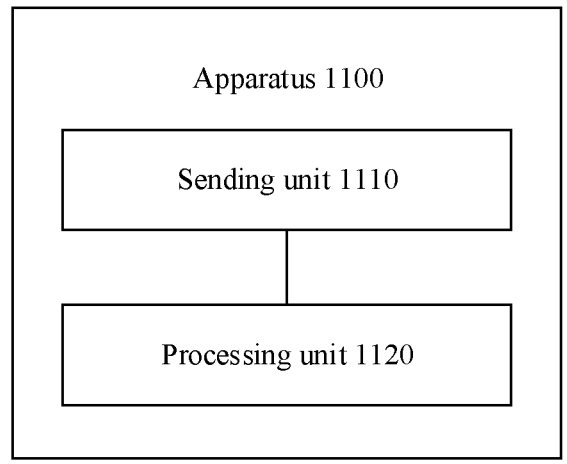
FIG. 11 is a diagram of an uplink multi-station channel estimation apparatus according to this application.

Refer to FIG. 11. FIG. 11 is a diagram of an uplink multi-station channel estimation apparatus 1100 according to this application. As shown in FIG. 11, the apparatus 1100 includes a receiving unit 1110 and a processing unit 1120.

The receiving unit 1110 is configured to receive a frame sent by each of a plurality of STAs. The frame includes a first group of training sequences and a second group of training sequences, and the first group of training sequences and the second group of training sequences are used for calculating a frequency offset value between a STA and an access point AP.

The processing unit 1120 is configured to perform channel estimation based on frequency offset values between the plurality of STAs and the AP.

The apparatus 1100 completely corresponds to the AP in the method embodiments. The apparatus 1100 may be the AP in the method embodiments, or a chip or a functional module inside the AP in the method embodiments. Corresponding units of the apparatus 1100 are configured to perform corresponding steps performed by the AP in the method embodiment shown in FIG. 6.

The receiving unit 1110 of the apparatus 1100 performs a sending step performed by the AP in the method embodiments, for example, step S620 of receiving the frame sent by the STA in FIG. 6.

The processing unit 1120 of the apparatus 1100 performs steps implemented or processed internally by the AP in the method embodiments, for example, step S630 of calculating a frequency offset value in FIG. 6 and step S640 of performing channel estimation in FIG. 6.

The apparatus 1100 may further include a sending unit, configured to perform a sending step performed by the AP, to send information to another device, for example, perform step S611 of sending indication information to the STA in FIG. 6. The receiving unit 1110 and the sending unit may form a transceiver unit, which has both a receiving function and a sending function. The processing unit 1120 may be a processor. The sending unit may be a transmitter. The receiving unit 1110 may be a receiver. The receiver and the transmitter may be integrated together to form a transceiver.

Figure 12:
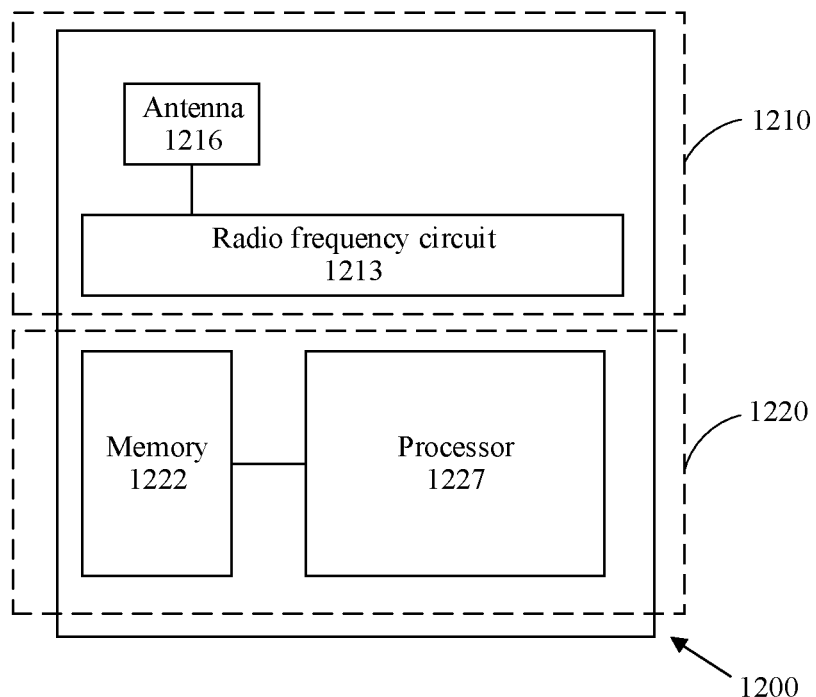
FIG. 12 is a diagram of an AP applicable to an embodiment of this application.

Refer to FIG. 12. FIG. 12 is a diagram of an AP 1200 applicable to an embodiment of this application. The AP 1200 may be configured to implement functions of the AP in the foregoing uplink multi-station channel estimation methods. FIG. 12 may be a diagram of a structure of the AP 1200.

The AP includes a part 1210 and a part 1220. The part 1210 is mainly configured to send and receive a radio frequency signal and perform conversion between the radio frequency signal and a baseband signal. The part 1220 is mainly configured to perform baseband processing, control a localization management component, and the like. The part 1210 may be usually referred to as a transceiver unit, a transceiver machine, a transceiver circuit, a transceiver, or the like. The part 1220 is usually a control center of the localization management component, may usually be referred to as a processing unit, and is configured to control the localization management component to perform a processing operation on an AP side in the foregoing method embodiments.

The transceiver unit in the part 1210 may also be referred to as a transceiver machine, a transceiver, or the like. The transceiver unit includes an antenna 1216 and a radio frequency unit 1213. The radio frequency unit 1213 is mainly configured to perform radio frequency processing. Optionally, a component that is in the part 1210 and that is configured to implement a receiving function may be considered as a receiving unit, and a component that is in the part 1210 and that is configured to implement a sending function may be considered as a sending unit. In other words, the part 1210 includes the receiving unit and the sending unit. The receiving unit may also be referred to as a receiver machine, a receiver, a receiver circuit, or the like. The sending unit may be referred to as a transmitter machine, a transmitter, a transmit circuit, or the like.

The part 1220 may include one or more boards, and each board may include one or more processors 1222 and one or more memories 1227. The processor 1222 is configured to read and execute a program in the memory 1227, to implement a baseband processing function and control the localization management component. If there are a plurality of boards, the boards may be interconnected to enhance a processing capability. In an optional implementation, the plurality of boards may share one or more processors 1222, or the plurality of boards may share one or more memories 1227, or the plurality of boards may simultaneously share one or more processors 1222.

It should be understood that FIG. 12 is merely an example instead of a limitation. The AP including the transceiver unit and the processing unit may not depend on the structure shown in FIG. 12.

It should further be understood that the AP 1200 shown in FIG. 12 can implement functions of the AP in the method embodiment in FIG. 6. Operations and/or functions of the units in the AP 1200 are respectively used to implement corresponding procedures performed by the AP in the method embodiments of this application. To avoid repetition, detailed descriptions are appropriately omitted herein. A structure of the AP shown in FIG. 12 is merely an embodiment, and should not constitute any limitation on this embodiment of this application. This application does not exclude a possibility that an AP structure of another form may appear in the future.

An embodiment of this application further provides a communication system. The communication system includes the foregoing STA and AP.

This application further provides a computer-readable storage medium. The computer-readable storage medium stores instructions. When the instructions are run on a computer, the computer is enabled to perform the steps performed by the STA in the method shown in FIG. 6.

This application further provides a computer-readable storage medium. The computer-readable storage medium stores instructions. When the instructions are run on a computer, the computer is enabled to perform the steps performed by the AP in the method shown in FIG. 6.

This application further provides a computer program product including instructions. When the computer program product is run on a computer, the computer is enabled to perform the steps performed by the STA in the method shown in FIG. 6.

This application further provides a computer program product including instructions.

When the computer program product is run on a computer, the computer is enabled to perform the steps performed by the AP in the method shown in FIG. 6.

This application further provides a chip, including a processor. The processor is configured to read and run a computer program stored in a memory, to perform corresponding operations and/or procedures performed by the STA in the uplink multi-station channel estimation method provided in this application. Optionally, the chip further includes the memory. The memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that need/needs to be processed. The processor obtains the data and/or information from the communication interface, and processes the data and/or information. The communication interface may be an input/output interface, an interface circuit, an output circuit, an input circuit, a pin, a related circuit, or the like on the chip. The processor may be alternatively embodied as a processing circuit or a logic circuit.

This application further provides a chip, including a processor. The processor is configured to read and run a computer program stored in a memory, to perform corresponding operations and/or procedures performed by the AP in the uplink multi-station channel estimation method provided in this application. Optionally, the chip further includes the memory. The memory is connected to the processor through a circuit or a wire, and the processor is configured to read and execute the computer program in the memory. Further, optionally, the chip further includes a communication interface, and the processor is connected to the communication interface. The communication interface is configured to receive data and/or information that need/needs to be processed. The processor obtains the data and/or information from the communication interface, and processes the data and/or information. The communication interface may be an input/output interface, an interface circuit, an output circuit, an input circuit, a pin, a related circuit, or the like on the chip. The processor may be alternatively embodied as a processing circuit or a logic circuit.

It should be understood that, the foregoing chip may be alternatively replaced with a chip system, and details are not described herein.

In this application, the terms "include", "comprise", and any other variants mean to cover the non-exclusive inclusion, for example, a process, method, system, product, or device that includes a list of steps or units is not necessarily limited to those steps or units that are clearly listed, but may include other steps or units not expressly listed or inherent to such a process, method, product, or device.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. A part or all of the units may be selected based on actual requirements to achieve the objectives of the solutions of the embodiments.

In addition, functional units in embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes any medium that can store program code, such as a USB flash drive, a removable hard disk drive, a read-only memory (ROM), a random access memory (RAM), a magnetic disk, or an optical disc.

In addition, the term "and/or" in this application describes only an association relationship for describing associated objects and represents that three relationships may exist. For example, A and/or B may indicate the following three cases: Only A exists, both A and B exist, and only B exists. In addition, the character "/" in this specification generally indicates an "or" relationship between the associated objects. The term "at least one" in this application may represent "one" and "two or more". For example, at least one of A, B, and C may indicate the following seven cases: Only A exists, only B exists, only C exists, both A and B exist, both A and C exist, both C and B exist, and A, B, and C exist.

In addition, the term "left-multiply/right-multiply . . . by" and their variants in this application describes a calculation manner used between matrices. For example, a matrix BA is obtained by left-multiplying a matrix A by a matrix B, and a matrix AB is obtained by right-multiplying the matrix A by the B matrix. The term "left-multiply/right-multiply . . . to" in this application describes a calculation manner between matrices. For example, the matrix AB is obtained by left-multiplying the matrix A to matrix B, and the matrix BA obtained by right-multiplying the matrix A to the matrix B.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An uplink multi-station channel estimation method, applied to any one of a plurality of stations (STAs) communicating with an access point (AP), the uplink multi-station channel estimation method comprising:
    generating, by the STA, a frame, the frame comprising a first group of training sequences and a second group of training sequences; and
    sending, by the STA, the frame to the AP, the first group of training sequences and the second group of training sequences are used for calculating a frequency offset value between the STA and the AP, and the frequency offset value is used for channel estimation.

2. The method according to claim 1, wherein before the generating the frame, the method further comprises:
    receiving, by the STA, indication information from the AP, the indication information indicating the STA to generate the frame.

3. The method according to claim 2, wherein the method further comprises at least one of the following:
    the indication information further indicating whether a preset phase identification matrix is used in the STA generating the frame; or
    the indication information further indicating an arrangement mode in the frame of the first group of training sequences and the second group of training sequences.

4. The method according to claim 1, wherein the first group of training sequences is obtained by multiplying a preset training sequence by an element that corresponds to the STA and that belongs to a matrix P; and
    the second group of training sequences is obtained by multiplying the preset training sequence by the element that corresponds to the STA and that belongs to a matrix P or a matrix P1;
    wherein the matrix P1 is determined based on a preset phase identification matrix, the matrix P is used for channel estimation and is known to the AP and the plurality of STAs.

5. The method according to claim 1, wherein the first group of training sequences occupies Q first locations in the frame, and the second group of training sequences occupies Q second locations in the frame;
    wherein the Q first locations and the Q second locations are sequentially arranged, or the Q first locations and the Q second locations are alternately arranged at an equal interval, wherein Q is an integer that meets a preset correspondence with M, and M is a total quantity of antennas of the plurality of STAs.

6. The method according to claim 1, wherein the first group of training sequences comprises one or more first training sequences, and the second group of training sequences comprises one or more second training sequences.

7. An uplink multi-station channel estimation method, applied to an access point (AP) communicating with a plurality of stations (STAs), the uplink multi-station channel estimation method comprising:
    receiving, by the AP, a frame sent by each STA of the plurality of STAs, the frame comprising a first group of training sequences and a second group of training sequences;
    calculating a frequency offset value between the each STA and the access point AP to generate a plurality of frequency offset values, the calculating using the first group of training sequences and the second group of training sequences; and
    performing, by the AP, channel estimation based on the plurality of frequency offset values between the plurality of STAs and the AP.

8. The method according to claim 7, wherein the method further comprises:
    sending, by the AP, indication information to the STA, the indication information indicating the STA to generate the frame.

9. The method according to claim 8, wherein the method further comprises at least one of the following:
    the indication information further indicating whether a preset phase identification matrix is used in the STA generating the frame; or
    the indication information further indicating an arrangement mode of the first group of training sequences and the second group of training sequences in the frame.

10. The method according to claim 7, wherein the first group of training sequences is obtained by multiplying a preset training sequence by an element that corresponds to the STA and belongs to a matrix P; and
    the second group of training sequences is obtained by multiplying the preset training sequence by the element that corresponds to the STA and belongs to a matrix P or a matrix P1;
    wherein the matrix P1 is determined based on a preset phase identification matrix, and the matrix P is used for channel estimation and is known to the AP and the plurality of STAs.

11. The method according to claim 7, wherein the first group of training sequences and the second group of training sequences comprising:
    the plurality of first groups of training sequences and a channel information matrix are used for determining a first information matrix; and
    the plurality of second groups of training sequences and the channel information matrix are used for determining a second information matrix;
    wherein the first information matrix and the second information matrix are used for calculating the plurality of frequency offset values between the plurality of STAs and the AP.

12. The method according to claim 11, wherein the performing the channel estimation based on the plurality of frequency offset values between the plurality of STAs and the AP comprises:
    correcting, by the AP, the matrix P based on the plurality of frequency offset values between the plurality of STAs and the AP to obtain a corrected matrix P; and
    determining, by the AP, the channel information matrix based on the corrected matrix P and based on the first information matrix and/or the second information matrix.

13. The method according to claim 7, wherein the first group of training sequences occupies Q first locations in the frame, and the second group of training sequences occupies Q second locations in the frame;
    wherein the Q first locations and the Q second locations are sequentially arranged, or the Q first locations and the Q second locations are alternately arranged at an equal interval, wherein Q is an integer that meets a preset correspondence with M, and M is a total quantity of antennas of the plurality of STAs.

14. The method according to claim 7, wherein the first group of training sequences comprises one or more first training sequences, and the second group of training sequences comprises one or more second training sequences.

15. A station, comprising:
a memory storing instructions; and
at least one processor in communication with the memory, the at least one processor configured, upon execution of the instructions, to perform the following steps:
generate a frame, the frame comprising a first group of training sequences and a second group of training sequences; and
send the frame to the AP, the first group of training sequences and the second group of training sequences are used for calculating a frequency offset value between a station (STA) and the AP, and the frequency offset value is used for channel estimation.

16. The station according to claim 15, wherein before the processing unit generates the frame, the station further comprises:
a receiving unit configured to receive indication information from the AP, the indication information indicating the STA to generate the frame.

17. The station according to claim 16, wherein the indication information further indicating whether a preset phase identification matrix is used in generating the frame; and/or
the indication information further indicating an arrangement mode in the frame of the first group of training sequences and the second group of training sequences.

18. The station according to claim 15, wherein the first group of training sequences is obtained by multiplying a preset training sequence by an element that corresponds to the STA and belongs to a matrix P; and
the second group of training sequences is obtained by multiplying the preset training sequence by the element that corresponds to the STA and belongs to a matrix P or a matrix P1;
wherein the matrix P1 is determined based on a preset phase identification matrix, the matrix P is used for channel estimation and is known to the AP and the plurality of STAs.

19. The station according to claim 15, wherein the first group of training sequences occupies Q first locations in the frame, and the second group of training sequences occupies Q second locations in the frame;
wherein the Q first locations and the Q second locations are sequentially arranged, or the Q first locations and the Q second locations are alternately arranged at an equal interval, wherein Q is an integer that meets a preset correspondence with M, and M is a total quantity of antennas of the plurality of STAs.

20. The station according to claim 15, wherein the first group of training sequences comprises one or more first training sequences, and the second group of training sequences comprises one or more second training sequences.

21. A access point (AP), comprising:
a memory storing instructions; and
at least one processor in communication with the memory, the at least one processor configured, upon execution of the instructions, to perform the following steps:
receive a frame sent by each station (STA) of a plurality of STAs, the frame comprising a first group of training sequences and a second group of training sequences;
calculate a frequency offset value between the each STA and the access point AP to generate a plurality of frequency offset values, the calculating using the first group of training sequences and the second group of training sequences; and
perform channel estimation based on the plurality of frequency offset values between the plurality of STAs and the AP.

22. The access point according to claim 21, wherein the access point further comprises:
a sending unit configured to send indication information to the STA, the indication information indicating the STA to generate the frame.

23. The access point according to claim 22, wherein the indication information further indicating whether a preset phase identification matrix is used in the STA generating the frame; and/or
the indication information further indicating an arrangement mode of the first group of training sequences and the second group of training sequences in the frame.

24. The access point according to claim 21, wherein the first group of training sequences is obtained by multiplying a preset training sequence by an element that corresponds to the STA and belongs to a matrix P; and
the second group of training sequences is obtained by multiplying the preset training sequence by the element that corresponds to the STA and belongs to a matrix P or a matrix P1;
wherein the matrix P1 is determined based on a preset phase identification matrix, and the matrix P is used for channel estimation and is known to the AP and the plurality of STAs.

25. The access point according to claim 21, wherein the first group of training sequences and the second group of training sequences comprising:
the plurality of first groups of training sequences and a channel information matrix are used for determining a first information matrix; and
the plurality of second groups of training sequences and the channel information matrix are used for determining a second information matrix;
wherein the first information matrix and the second information matrix are used for calculating the plurality of frequency offset values between the plurality of STAs and the AP.

26. The access point according to claim 25, wherein the performing, by a processing unit, the channel estimation based on the plurality of frequency offset values between the plurality of STAs and the AP comprises:
correcting the matrix P based on the frequency offset values between the plurality of STAs and the AP to obtain a corrected matrix P; and
determining the channel information matrix based on the corrected matrix P and based on the first information matrix and/or the second information matrix.

27. The access point according to claim 21, wherein the first group of training sequences occupies Q first locations in the frame, and the second group of training sequences occupies Q second locations in the frame;
wherein the Q first locations and the Q second locations are sequentially arranged, or the Q first locations and the Q second locations are alternately arranged at an equal interval, wherein Q is an integer that meets a preset correspondence with M, and M is a total quantity of antennas of the plurality of STAs.

28. The access point according to claim 21, wherein the first group of training sequences comprises one or more first training sequences, and the second group of training sequences comprises one or more second training sequences.

\* \* \* \* \*